United States Patent

Tuhro et al.

[11] Patent Number: 5,163,536
[45] Date of Patent: Nov. 17, 1992

[54] MODULAR FOODSERVICE EQUIPMENT

[75] Inventors: Albert P. Tuhro, Fenton; Frank Kremer, Pacific; Michael G. Hanewinkel, High Ridge, all of Mo.

[73] Assignee: Southern Equipment Company, St. Louis, Mo.

[21] Appl. No.: 620,076

[22] Filed: Nov. 30, 1990

[51] Int. Cl.$^5$ .................. A47B 47/03; A47F 3/04
[52] U.S. Cl. ...................... 186/44; 193/38; 312/198; 312/236
[58] Field of Search .......... 186/38, 44; 193/38; 312/111, 137, 140, 140.1, 140.2, 140.3, 140.4, 198, 203, 236, 256, 349

[56] References Cited

U.S. PATENT DOCUMENTS

| | | | |
|---|---|---|---|
| 1,247,443 | 11/1917 | Nones | 312/140 |
| 2,894,604 | 7/1959 | McMillan | 186/44 |
| 2,900,045 | 3/1958 | Conklin et al. | 186/1 |
| 3,031,245 | 4/1962 | Phillips | 193/38 X |
| 3,159,438 | 12/1964 | Carlson et al. | 312/256 X |
| 3,162,495 | 12/1964 | Swift | 186/44 X |
| 3,170,541 | 2/1965 | Werner | 186/44 |
| 3,478,193 | 2/1966 | Molitor | 219/386 |
| 3,578,148 | 5/1971 | Pinckard | 186/44 X |
| 3,874,479 | 4/1975 | Onori et al. | 186/44 |
| 3,926,489 | 12/1975 | Futch | 312/250 |
| 3,971,605 | 7/1976 | Sasnett | 312/236 X |
| 4,032,821 | 6/1977 | Keiser | 361/334 |
| 4,433,881 | 2/1984 | Witten et al. | 312/198 X |

Primary Examiner—F. J. Bartuska
Attorney, Agent, or Firm—Richard G. Heywood

[57] ABSTRACT

A two-tier counter system for use in commercial foodservice having an upper level of top-defining modular counter units with upper work areas, end margins of substantially identical profile and dual latching apparatus for releasably interlocking adjacent units together in mating end-to-end abutting relationship; and a lower level of base-defining cabinet and leg supports for underlying supporting placement relative to the upper level counter units; and continuous mounting apparatus constructed and arranged for accommodating selective longitudinal positioning of the lower level supports relative to the upper level units. The invention also includes the modular top-defining counter unit, and the method of assemblying the counter unit.

40 Claims, 19 Drawing Sheets

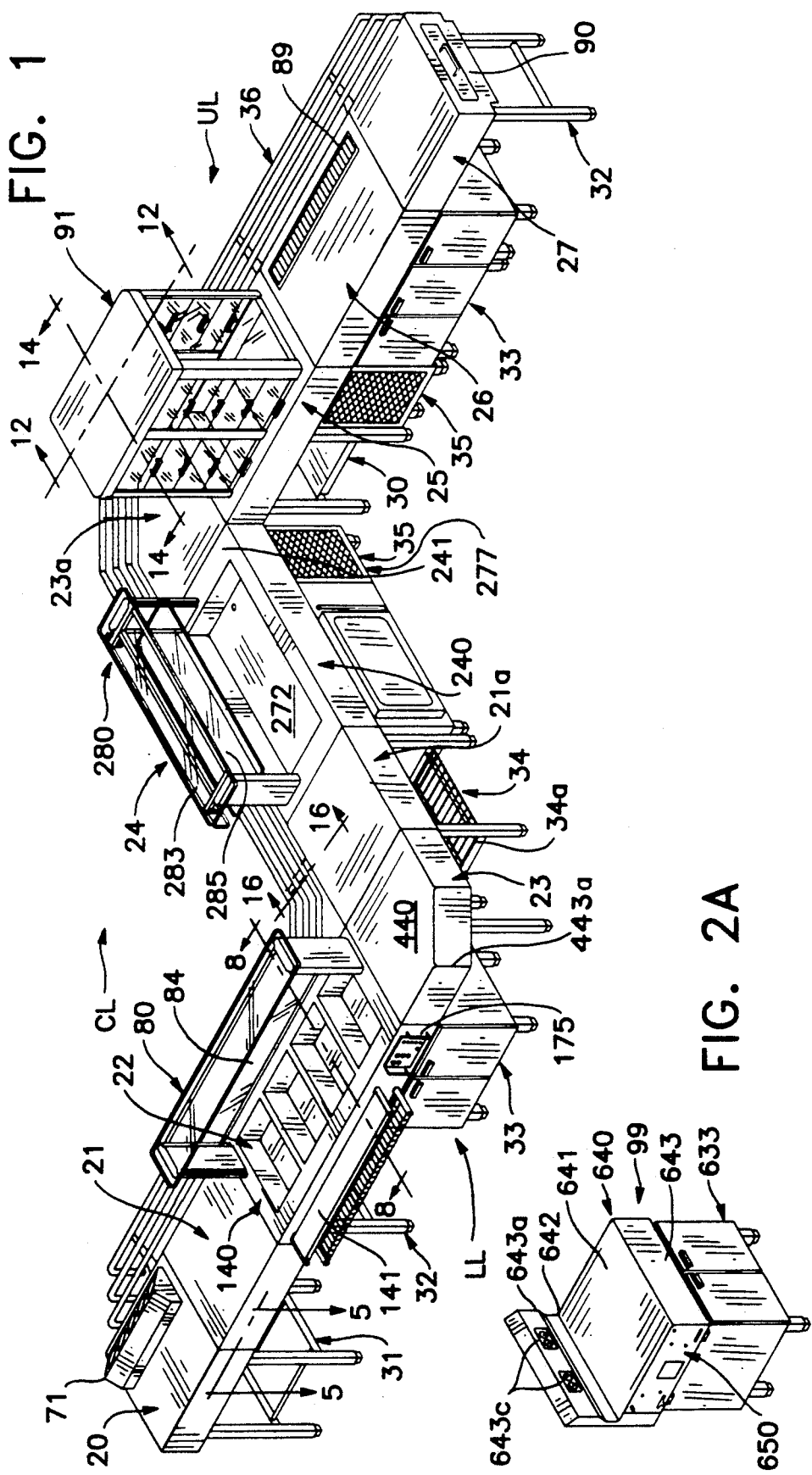

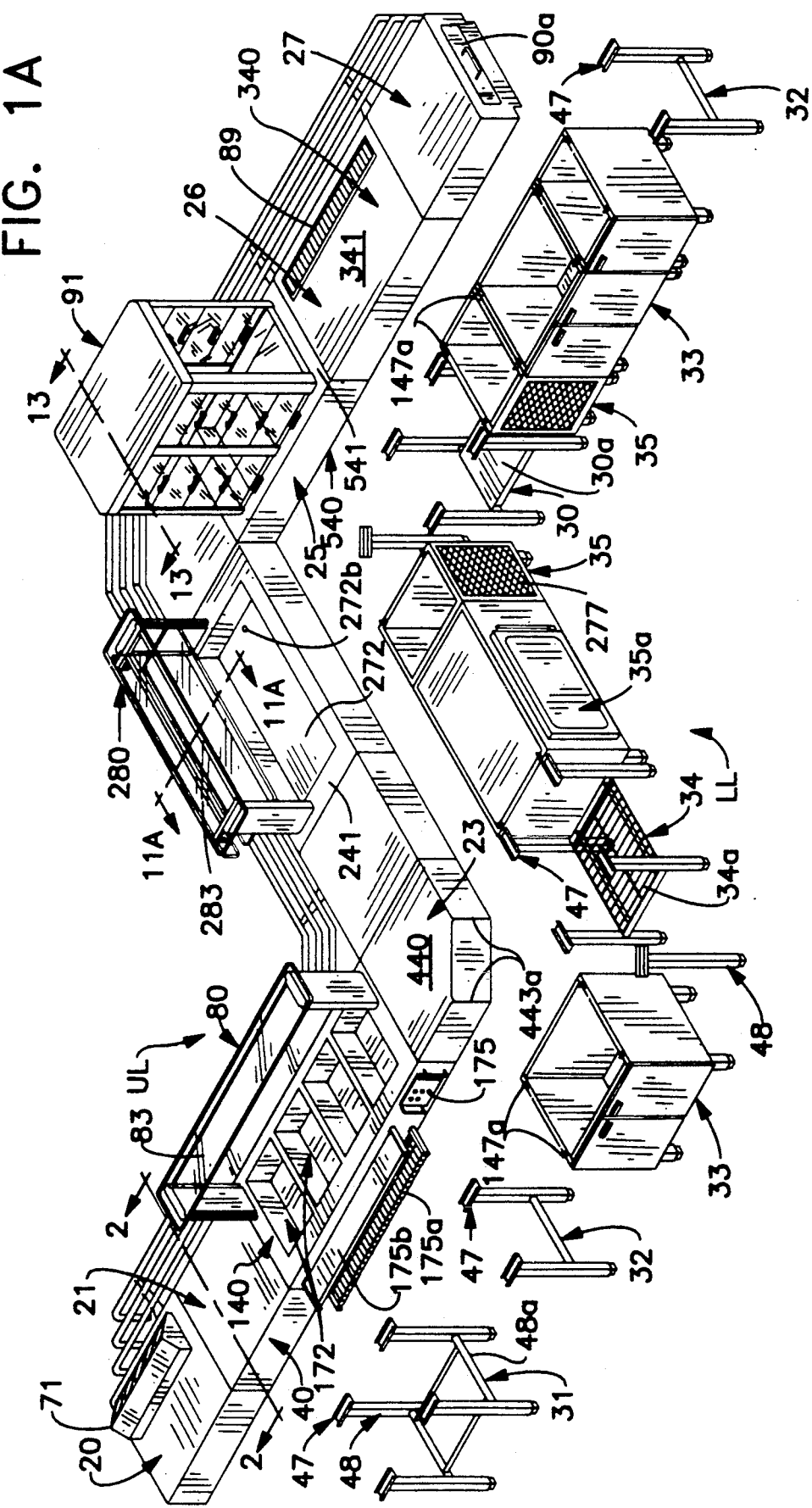

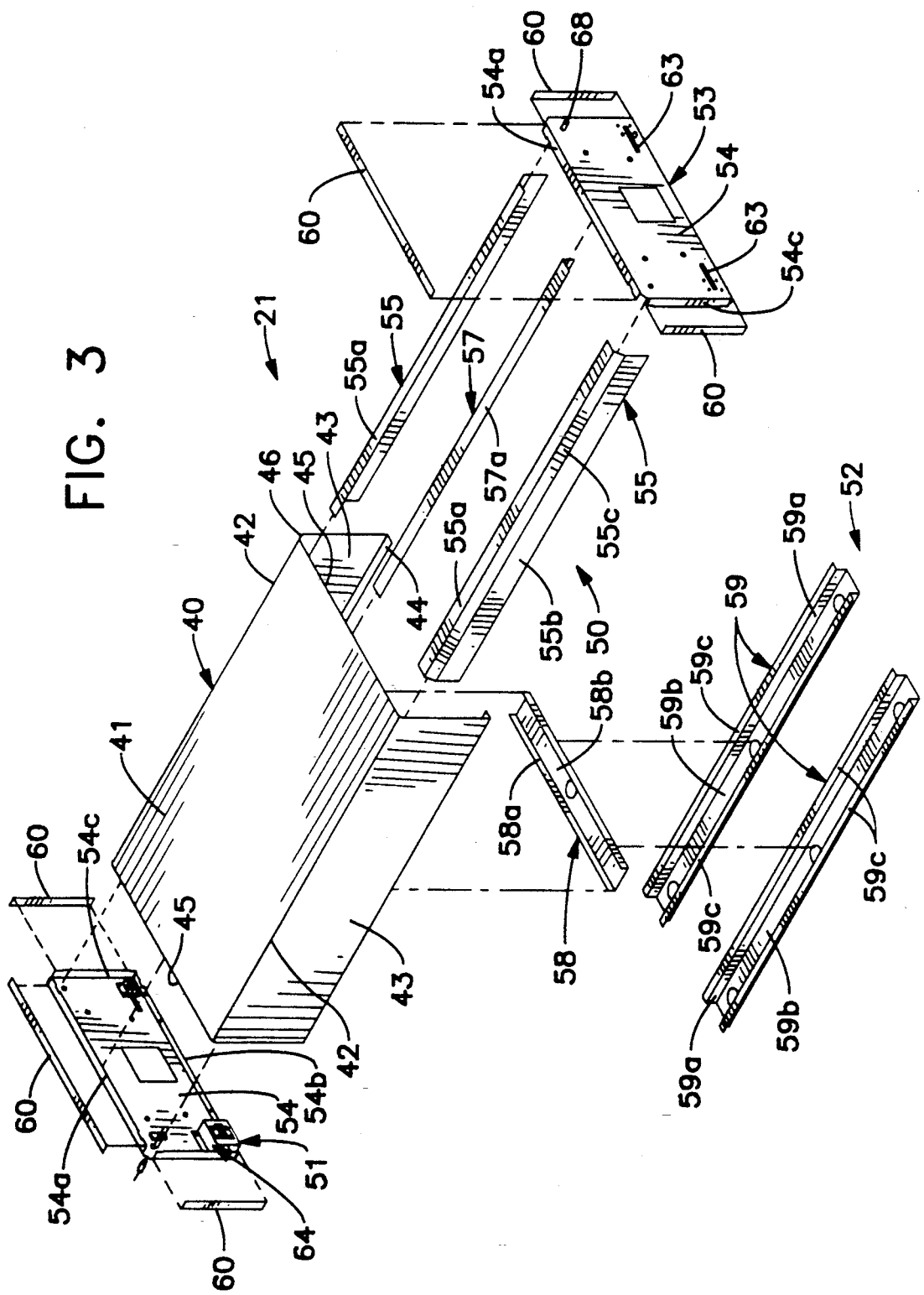

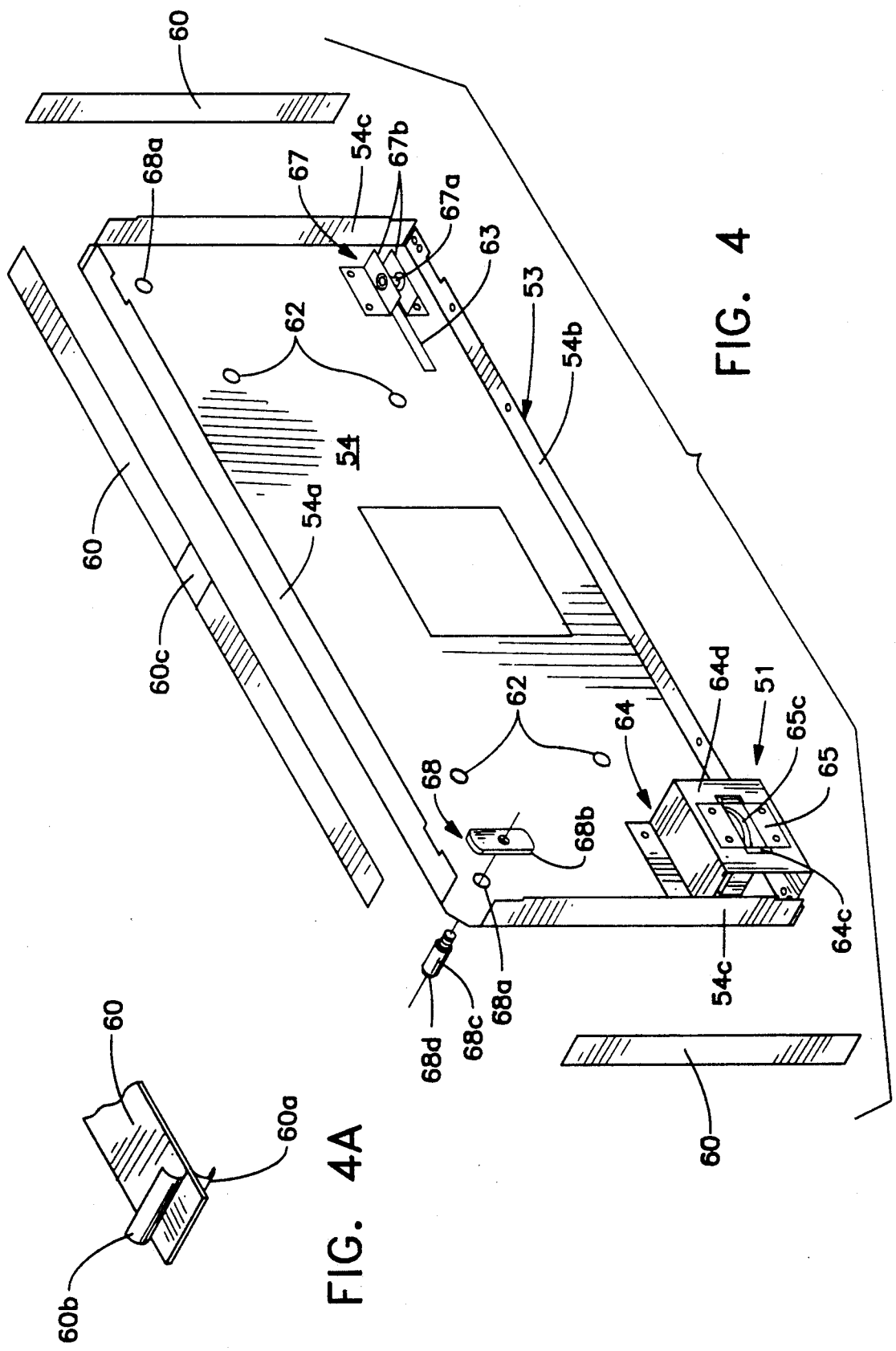

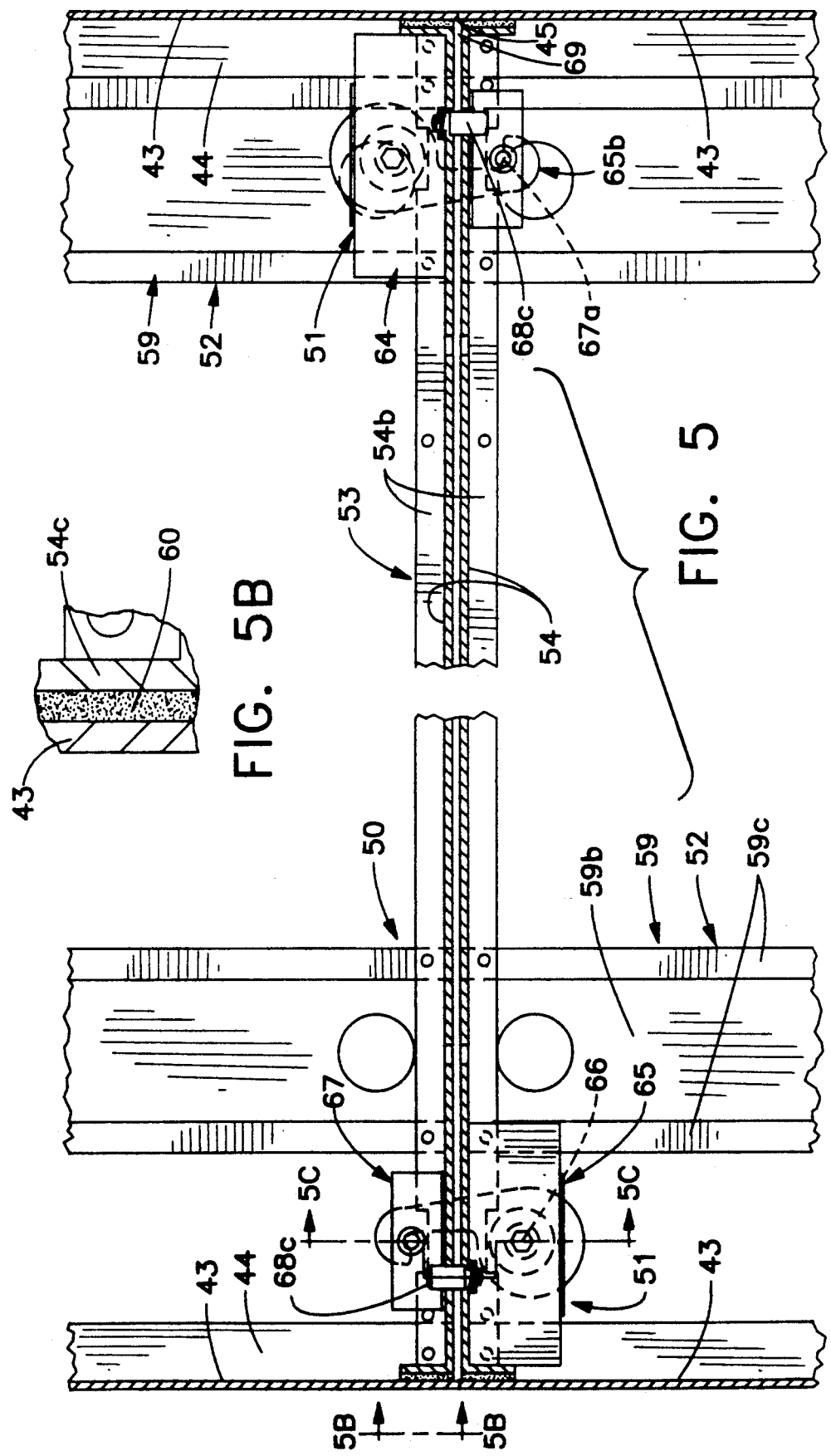

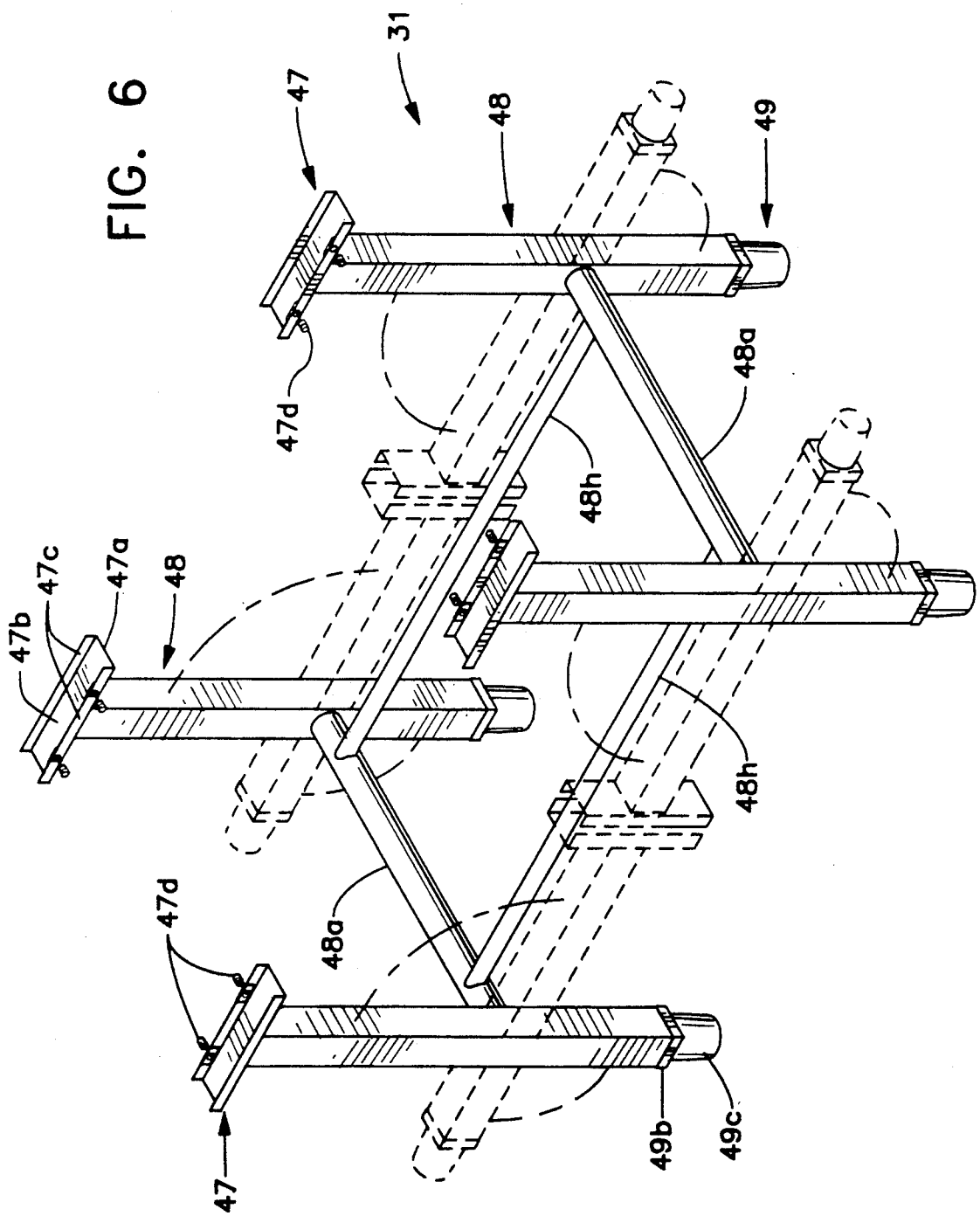

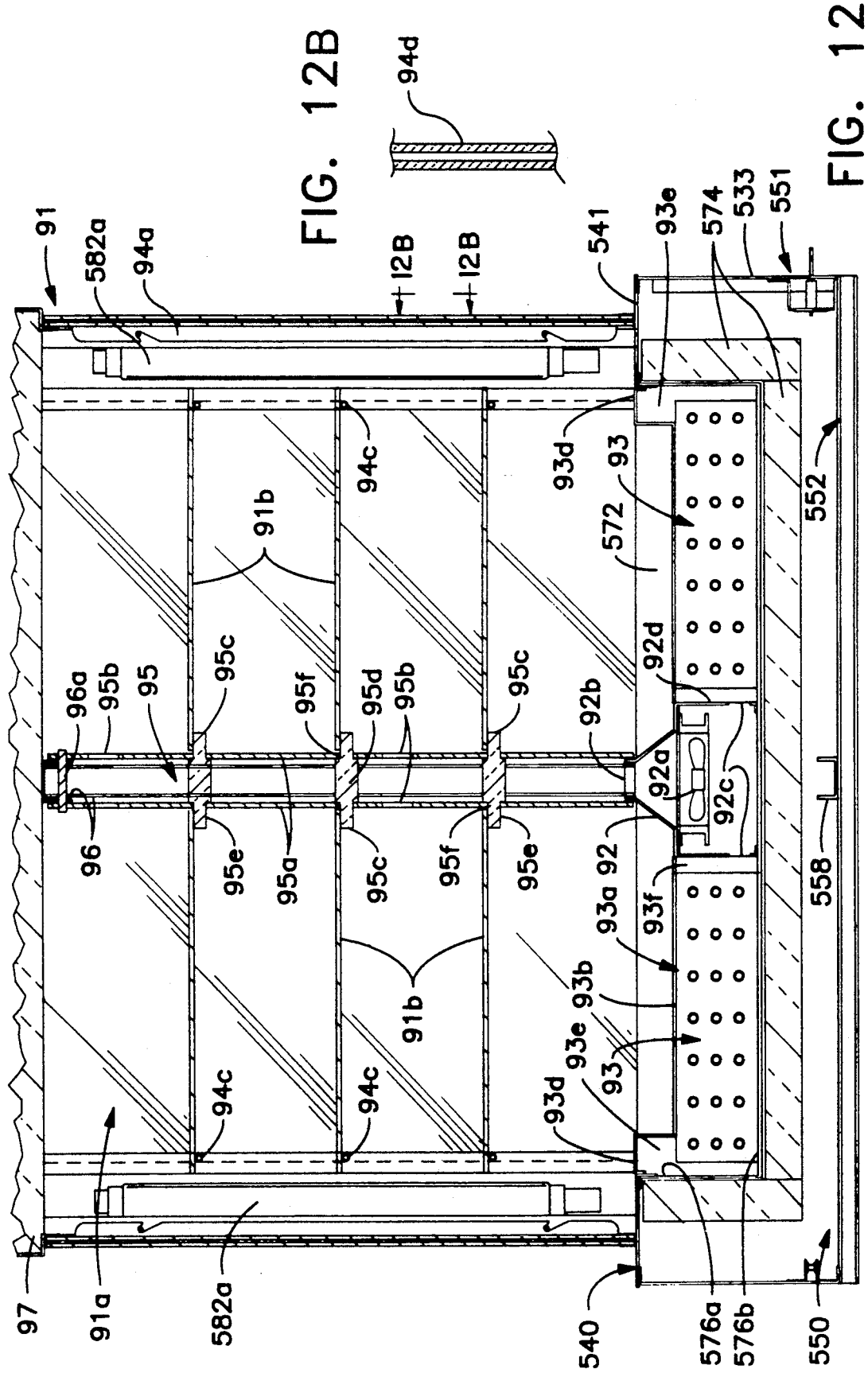

MODULAR FOODSERVICE EQUIPMENT

FIELD OF THE INVENTION

This invention relates generally to commercial foodservice equipment, and more particularly to modular counter units for food preparation in commercial kitchens and the service of prepared foods in cafeteria and buffet lines and the like.

BACKGROUND OF THE INVENTION

Foodservice equipment is used in commercial kitchens in the food preparation for volume-feeding facilities, such as restaurants, hotels, institutions, corporate dining rooms and the like, and in the presentation and service of prepared foods in cafeteria and buffet lines and the like.

In the past such commercial foodservice equipment has traditionally been custom designed for various specific foodservice functions so that each type of counter unit was self-contained and free standing. In one form of the prior art each counter unit is individually designed with a countertop integrally built onto a supporting base selected by the manufacturer to be compatible with the foodservice function of the top panel. Thus, once the countertop function was selected, the foodservice provider was forced to take the type of base configuration made available by the equipment manufacturer or, alternatively, the buyer had to order a customized counter unit made to his specifications and at a significantly greater cost.

Some modular-types of foodservice equipment have been provided in the past. Reference is made to McMillan U.S. Pat. No. 2,894,604 illustrating a typical form of prior equipment in which a series of compatible base units are selected (according to function) for a cafeteria or buffet line-up, and a unitary countertop is attached to match and orient the required surface configuration to the underlying supporting function. In some instances, separate foodservice units have been designed with mating top surface profiles, but all these prior equipment arrangements have used traditional nut-bolt assembly hardware and either the traditional preassembled form of counter unit must be moved around for assembly in an equipment line-up or the countertop surface must be assembled on the base cabinet line-up employing similar techniques to those used in domestic (household) kitchens. In addition, all counters used in preparing or serving food products are made of stainless steel, according to health standards, and traditionally heavy gauge stainless of at least 14 ga. has been deemed necessary heretofore, thus making the unit cost of commercial kitchens very high. Thus, in the past commercial foodservice counters have been very expensive, the selectivity of counter/base arrangements have been limited, the manufacturing and delivery time has been long, and assembly of equipment line-ups has been awkward and time consuming.

SUMMARY OF THE INVENTION

The invention is embodied in a modular top-defining foodservice unit constructed and arranged for interlocking relationship with at least one other top-defining unit to form a substantially continuous counter, in which the modular unit has a countertop with a horizontal wall component and at least one vertical wall component both having edge margin profiles configured for mating engagement, a support frame for the countertop including transverse end members underlying the countertop in engagement with the wall components adjacent to the edge margins, latching means constructed and arranged on one end member for interlocking engagement with cooperating end means of another top-defining unit, and mounting means constructed and arranged for selective longitudinal engagement by a supporting base unit. The invention is further embodied in a two-tier counter system for commercial foodservice, including an upper level of at least two top-defining modular counter units having mating edge profiles and disposed in longitudinal end-to-end abutting relationship, and latching means releasably interlocking said counter units together, a lower level of base-defining support means disposed in supporting position relative to at least one of the counter units, and means for accommodating selective placement of the support means below the counter units.

A principal object of the present invention is to provide a modular counter unit for commercial foodservice equipment affording great design flexibility.

Another object is to provide a two-tier counter system with selective alignment of upper level modular countertop units and selective use and placement of lower level base means.

Another object is to provide a modular counter unit that is rugged in construction, economically manufactured without welding, consists of smaller components for facilitating handling and shipment, permits easy assembly by non-skilled labor, and is easily disassembled for revision in equipment line-up or relocation.

Still another object is to provide novel modular foodservice equipment, particularly commercial kitchen fixtures, back bars, and cafeteria and buffet food delivery structures.

These and still other objects and advantages will become more apparent hereinafter.

BRIEF DESCRIPTION OF THE DRAWINGS

In the accompanying drawings, which form a part of the specification and wherein like numerals refer to like parts wherever they occur:

FIG. 1 is a diagrammatic perspective of a typical cafeteria line embodying the present invention;

FIG. 1A is a view similar to FIG. 1, partially exploded to illustrate the two-tier counter system of the invention;

FIG. 2A is a diagrammatic perspective view of the back bar counter unit modification;

FIG. 3 is an enlarged diagrammatic and exploded perspective view of the modular counter of FIG. 2;

FIG. 4 is a greatly enlarged diagrammatic perspective view, partially exploded, of the counter unit end panel of FIG. 2;

FIG. 4A is a greatly enlarged fragmentary perspective view of a double sided adhesive strip utilized in the present invention;

FIG. 5 is a fragmentary horizontal cross-sectional view taken substantially along line 5—5 of FIG. 1, and showing the mating assembly between two modular counter units in the upper level tier of the system;

FIG. 5B is a greatly enlarged fragmentary sectional view showing the adhesive assembly of the modular counter unit as taken substantially at line 5B—5B of FIG. 5;

FIG. 6 is an enlarged diagrammatic perspective view of a compound leg base assembly forming a part of the present

FIG. 12 is an enlarged vertical cross-sectional view of a refrigerated selector case form of the modular counter invention as taken substantially along line 12—12 of FIG. 1;

FIG. 12B is a greatly enlarged fragmentary sectional view of selector case thermopane end windows taken at line 12B—12B from FIG. 12;

DESCRIPTION OF THE PREFERRED EMBODIMENTS

Figure 2:
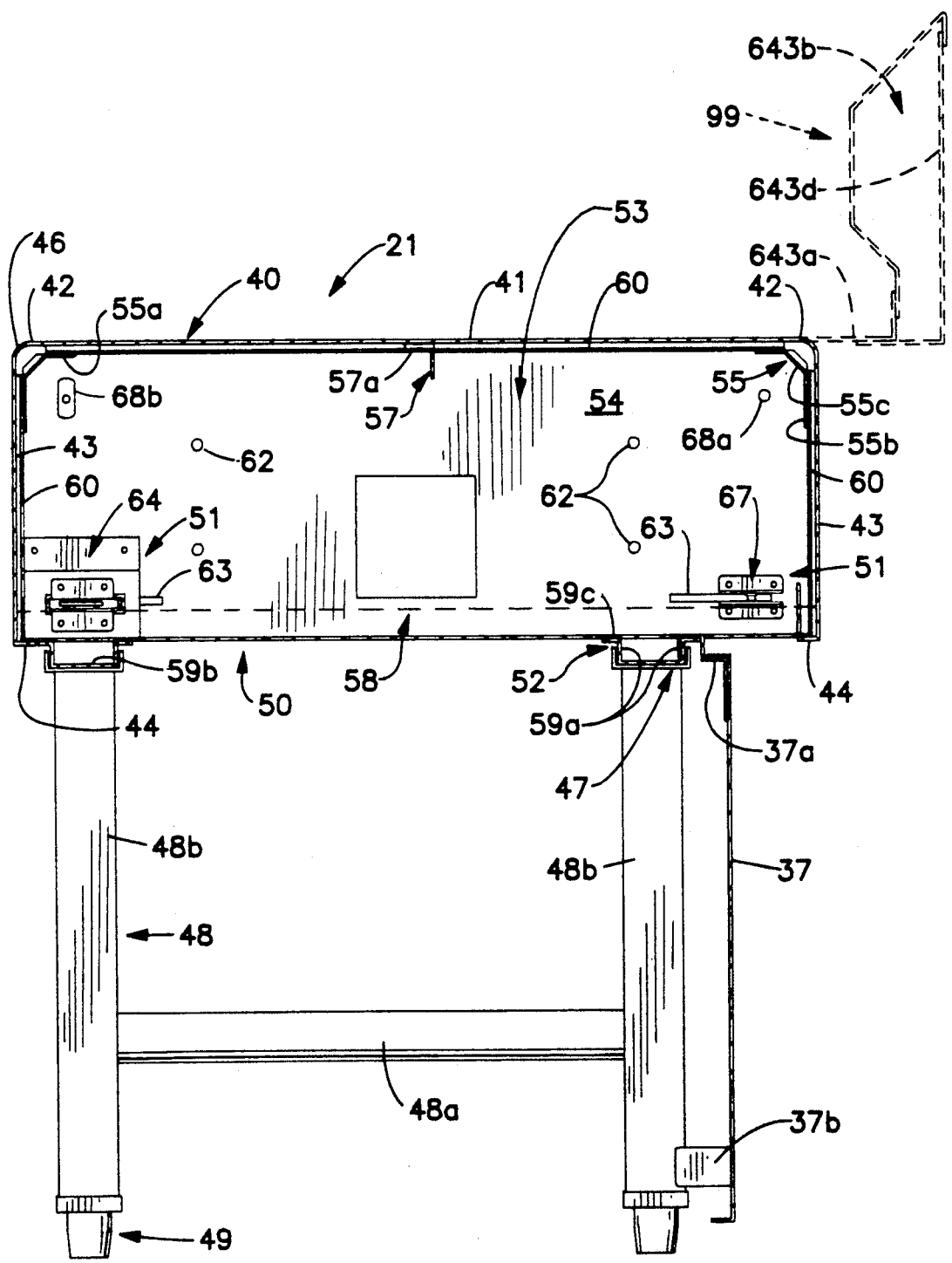
FIG. 2 is a vertical cross-sectional view taken substantially along line 2—2 of FIG. 1A showing one form of modular counter unit and a supporting leg assembly unit therefor, and also illustrating in phantom lines a commercial kitchen back bar modification of the modular counter unit.
Figure 5A:
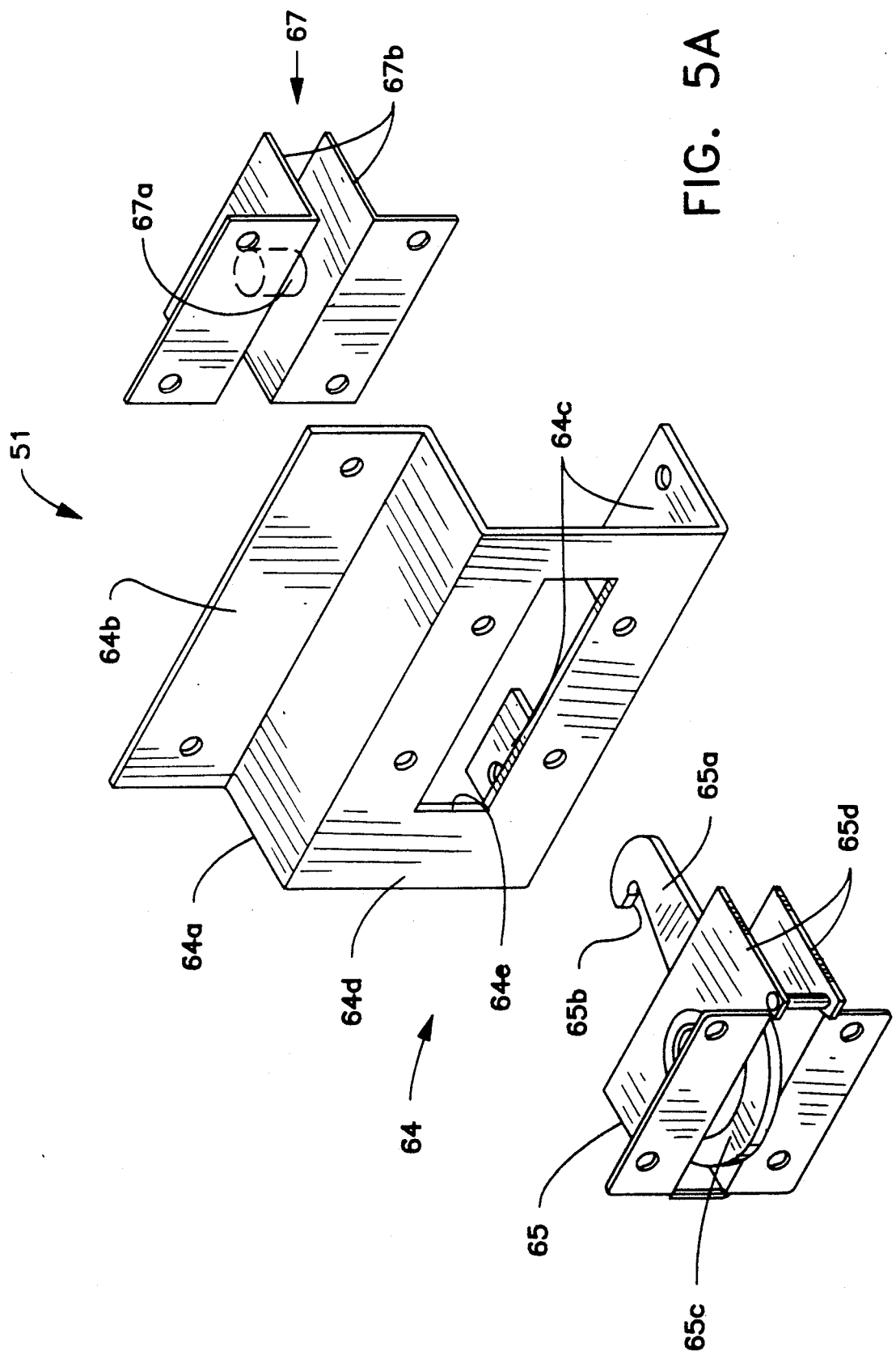
FIG. 5A is an enlarged exploded perspective view of the component parts of interlocking latching means on adjacent modular counter units.
Figure 5C:
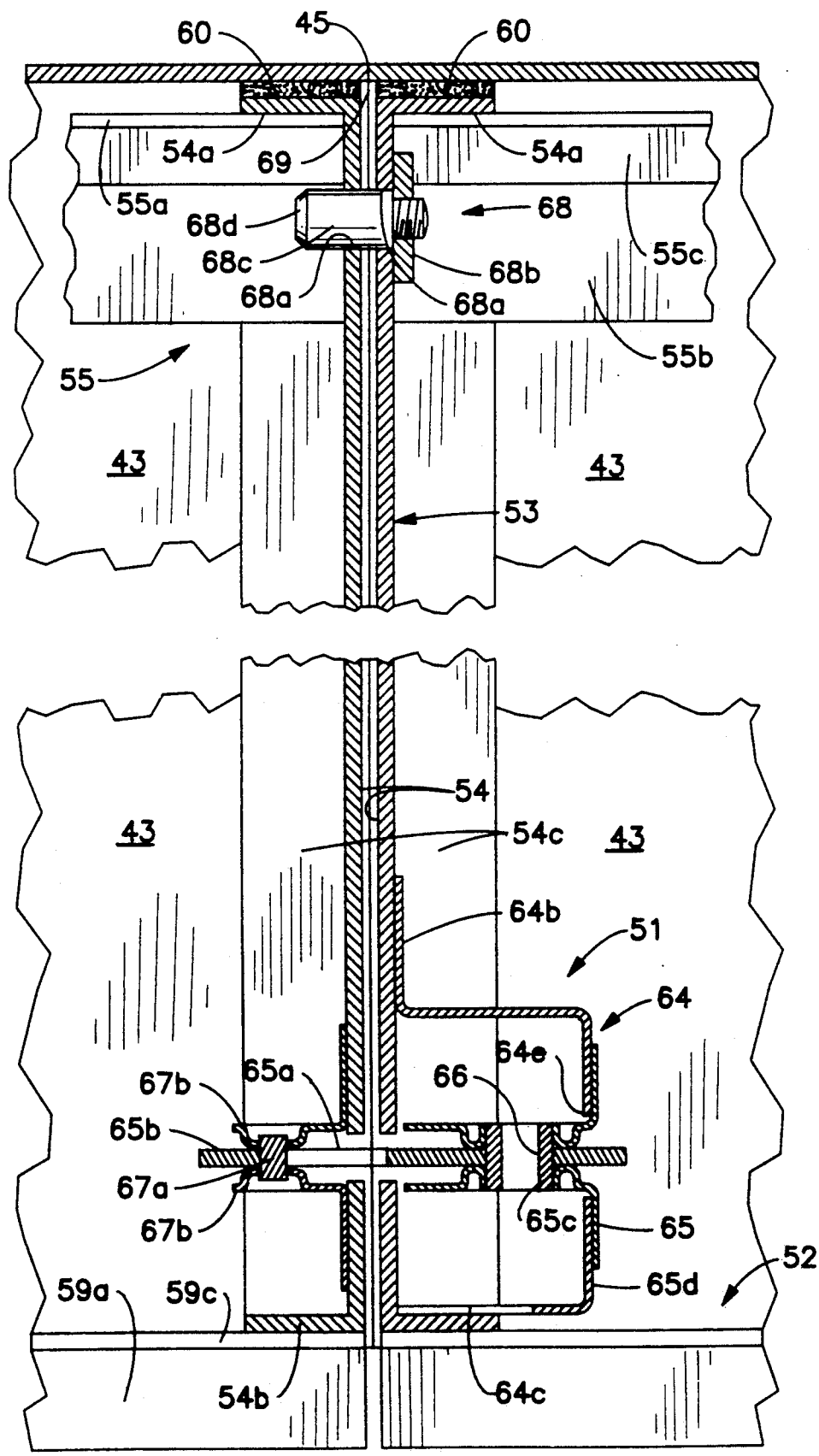
FIG. 5C is a greatly enlarged vertical cross-sectional view taken along line 5C—5C of FIG. 5.

The invention is embodied in a two-tier foodservice counter system having an upper level of novel modular counter units used in commercial food preparation and service, such as chef's fixtures and back bars in commercial kitchens and food preparation areas, free standing cafeteria lines, buffet lines and the like, and having a lower level of supporting base cabinets, legs and other means selectively mountable below the upper level counter units. For disclosure purposes, preferred embodiments of the invention are illustrated in a cafeteria line CL shown from its back or service side in FIGS. 1 and 1A. The cafeteria line CL embodies the two-tier system of the invention, and has an upper food holding or display level of top-defining counter units UL and a lower support and storage level of base-defining support means LL. The upper level counters UL may include a starter station 20 traditionally accommodating trays, dishes, napkins and tableware service; a basic surface counter unit or filler 21 for serving food products at ambient or for use as a work station, a hot food or steam table unit 22, an inside corner work unit 23, another surface unit or work table 21A, a cold pan or frost top unit 24 for iced or refrigerated foods (and beverages), an outside corner unit 23A, a selector case 25 for refrigerated foods, a beverage or drink dispensing counter 26 for beverage service, and a cashier or checkout station 27. The lower base level LL cafeteria line CL may be comprised of various storage and support base-defining units including open shelf or cabinet units 30, compound leg assemblies 31, dual leg assemblies 32, closed cabinet base units 33, wire shelf units 34, refrigerated base units 35 and the like. One feature of the present invention is the almost total flexibility in the selection, placement and movability of the various base-defining units of the lower level LL relative to the upper level counters UL, as will appear. A cafeteria line CL will also include a continuous tray slide 36 mounted on the outer or customer side, and the outer customer side of the lower or base level LL (both opposite sides in a buffet line) is typically closed by side panels 37 (not shown in FIGS. 1 and 1A).

The surface counter unit 21 shown in FIGS. 2-5C is representative of the basic construction of each of the modular upper level counters UL of the present invention. In its simplest form the modular counter unit (21) of the invention is embodied in a top-defining unit having an outer cover shell or countertop 40 configured with a preselected width and height (and selected length) and with a predetermined uniform end edge profile for aligned mating or abutting engagement with other modular units; and a main structural frame 50 constructed and arranged for underlying supporting attachment to the countertop 40. The main frame 50 includes latching means 51 for interlocking with other modular counter units UL in aligned assembly, and mounting means 52 for the selective attachment of a lower-tier leg or base unit LL, as will appear.

Referring particularly to FIGS. 2 and 3, the the countertop 40 has a horizontal wall section 41 whose preselected width is defined by laterally spaced sides 42, and opposing vertical side wall sections 43 define the preselected height and are integrally formed with and extend downwardly from the opposite longitudinal sides 42 of the horizontal wall section 41. The bottom margins of the side wall sections 43 have inturned flanges 44 extending longitudinally substantially from end-to-end of the countertop, and the length of the countertop is defined by end margins 45. The horizontal and vertical wall sections 41 and 43 may be connected by radius bends 46 to form non-angular curved corners at the side margins 42 of the top wall section 41.

The main frame 50 for the countertop 40 includes transversely and vertically disposed outer end members 53 constructed to underlie and support the countertop immediately adjacent to the end margins 45 thereof. The end members 53 are principal components in the modular unit for interlocking upper counter units UL in the two-tier system of the invention. Each end member 53 is stamped and punched to form the vertical end panel 54 thereof, with right angled flanges 54a, 54b and 54c extending along the upper and lower edges and opposed side edges. The main frame 50 also has laterally spaced longitudinal side frame members 55 rigidly secured to and interconnecting the upper corners of the end members 53, and the mounting means 52 also extend between and rigidly reinforce the end members 53 in forming the main frame structure.

The longitudinal side frame members 55 are constructed and arranged in underlying supporting position with the horizontal wall section 41 of the countertop 4 substantially at its longitudinal side margins 42. More specifically, the longitudinal side frame members 55 are preferably located at positions adjacent the curved corners 46 at the junctures of the horizontal wall 41 with the vertical wall sections 43. Each longitudinal side frame member 55 includes horizontal and vertical support components comprising a horizontally disposed flange 55a and a vertically disposed flange 55b preferably connected by an angular bridging beam 55c. Thus, as shown in FIG. 3, the horizontal flanges 55a of the longitudinal side frame members 55 are secured to and support the underside of the horizontal wall section 41 of the countertop 40 immediately adjacent to the curved corners, and the vertical flanges 55b are secured to the vertical wall sections 43 of the countertop 40. The beam means 55c extend at an oblique angle between the flanges 55a and 55b and form an angular bridge, which with the curved corners 46 translate loads from the horizontal wall section 41 to the vertical wall sections 43 and main support frame 50. Of course, the beam means may be configured to directly support the entire curved corner of the countertop 40.

One object of the invention is to reduce costs of the subject modular counter invention and, to that end, it is proposed to utilize 16 or 18 gauge stainless steel as the preferred material for the countertop 40 in lieu of the heavier and substantially costlier 14 gauge stainless that is conventionally used. Accordingly, although the simple main frame structure as described is designed to provide sufficient strength and rigidity for smaller sized countertops, such as used in back bars (see FIG. 2A), it is preferable to use some additional frame structure on longer countertop units and/or on wider countertops formed only with a substantially flat table top panel 41, as in the basic unit 21 of FIGS. 2 and 3. In such larger units intermediate structural support means are employed, such as a strut member 57 comprising an angle iron brace secured to the under surface of countertop 40 between the end members 54 and having a horizontal flange 57a engaging and stiffening the horizontal wall 41 in a central location intermediate the vertical wall sections 43. Another intermediate structural support means is a transverse support frame member 58 which may be provided at predetermined longitudinally spaced intervals between the end panels 53, such as every 48 inches of length of the countertop 40. The transverse support frame member 58 extends transversely of the countertop 40 between the vertical wall sections 43 and is rigidly secured to the mounting means 52 adjacent to its opposite longitudinal ends.

As described in more detail hereinafter, the mounting means comprise a mounting track defined by a pair of similar elongated, laterally spaced, hat channels 59 provided for mounting the counter unit 21 onto a supporting base or leg unit LL. Each hat channel 59 of the mounting means 52 has an upward opening, central channel defined by opposed side walls 59a connected by a bottom wall 59b, and outwardly extending flanges 59c are formed from the tops of these side walls 59a. The transverse frame 58 has a similar central channel. Thus, it is clear that the ends of the flanges 59c are rigidly secured to the bottom flanges 54b of the end panels 53 to position the track means at predetermined laterally spaced locations with the side walls 59a extending downwardly below the end members of the countertop unit 21. The transverse frame 58, when needed, extends transversely across and above the track means 59 so that its bottom wall (58b) engages and is secured, such as by pop rivets (not shown), to the mounting means flanges 59c without interference with the longitudinal track function, as will appear. Thus, it will be seen that the basic main frame 50 comprises a simple arrangement of end frame members 53 rigidly interconnected by longitudinal structural support frames 55 and mounting members 52 to provide a solid, relatively lightweight foundation with a substantially open or hollow interior that will accommodate differently configured countertop units UL for different foodservice purposes. It is also clear that the countertop per se is basically a covering or shell applicable over the main frame, and permitting a unique manufacturing assembly technique in the field of foodservice equipment.

Still referring to FIGS. 2-5C, it may be seen that the countertop 40 is assembled onto the main frame 50 and secured thereon adhesively rather than being attached by welding or with other mechanical fasteners, which increases the assembly speed and reduces construction costs. More specifically, a strongly bonding, double sided adhesive tape 60 such as "3M VHB" acrylic tape (a trademark of 3M Company) is used. As one step, the tape 60 is first applied to the outer surfaces of the end members top and side flanges 54a and 54c after removing the protective fabric or paper covering 60a on one side, see FIG. 4A. The countertop 40 and main frame 50 are then assembled in an inverted position using an assembly jig or fixture (not shown) suitable for the purpose. First, the countertop 40 is laid upside down on the bed of such a fixture in the inverted position so that its countertop 41 now forms the bottom and the side walls 43 extend upwardly. Spreader bars or like means (not shown) are used to engage the side wall flanges 44 and draw them apart an optimum distance so as to flex the side walls 43 outwardly to open up the countertop interior and cause the horizontal panel 41 to bow upwardly in its longitudinally center area. The main frame 50 is precisely located in inverted position between end fixtures (not shown) of the assembly jig by reason of inwardly projecting pins on the end fixtures being received in the openings 62 of the end members 53, and a central section 60c (see FIG. 4A) of the outer tape covering 60b is then removed. The main frame 50 is oriented in precise longitudinal alignment with the countertop 40 as the outer marginal edges 45 of the side walls 43 are slidably received between the end fixtures on the main frame 50, and the central sections 60c on the outer end wall flanges 54a establish a centering "tacking" spot that engages the central bowed area of the horizontal wall 41 as the main frame 50 is seated thereagainst. The remaining outer adhesive cover 60b of the end wall flanges 54a is then stripped away and the spreader bars are removed to secure the end wall flanges 54a across the horizontal wall. The side flanges 54c are then secured to the countertop side walls 43 by stripping the outer covering 60b therefrom and then pressing the side walls inwardly. Thus, once oriented and centrally "tacked", the protective covering 60b on the remaining adhesive areas is selectively removed in a sequential process as the countertop shell is pressed onto the frame 50 in permanent assembly. If desired, the strut member or brace 57 can be adhesively applied to the countertop (40) at the end of the assembly. It may also be noted that the end walls 54 of the main frame 50 are provided with four openings 62 that are used for orienting the frame 50 on the assembly fixture, and which may also be used in the final installation of counter units UL.

The other counter units of the invention have substantially the same modular construction as the basic counter unit 21 just described. The latch mechanism 51 for interlocking these modular counter units to form the upper level tier UL of the two-tier system will be described with particular reference to FIGS. 2, 4, 5, 5A and 5C. The end panel 54 of each end member 53 of the main frame 50 is provided with two cooperating elements of the latching mechanism 51, and FIG. 3 shows that the end panel 54 is identically punched and slotted (at 63) at its lower outer corners for accommodating such latching elements. One element comprises a cam-action latching hook mechanism 64 comprising a channel housing bracket 64a with vertical flange 64b secured to the end panel 54 and spaced horizontal flange tabs 64c secured to the lower end member flange 54b and a vertical wall 64d connecting the flange tabs 64c. This housing bracket 64 is mounted on the inner frame side of the end member 53 (lower left-hand corner looking outwardly from inside the main frame 50). The channel wall 64d has an opening 64e to receive and locate a cam-action hook device 65 within the channel. The hook device 65 has a hook plate 65a with a hooked latch end 65b, and the hook plate 65a is mounted in an eccentric cam disc 65c journalled between spaced mounting brackets 65d. The cam disc 65c has a driving opening or key 66 (FIGS. 5 and 5C) vertically accessible between the flanged tabs 64c of the housing bracket 64a for vertically receiving a tool, such as an Allen wrench (not shown), to rotate the hook plate 65a from a remote, disengaged position (lying laterally within the bracket housing 64a along the inside of end panel 54) to an extended operative position in which the latch end 65b is swung outwardly through its end panel slot 63 for interlocking engagement with its cooperating latching element 67. This mating or cooperating latching element 67 comprises a vertical latch pin 67a mounted between brackets 67b secured to the end plate 54 (lower right-hand corner in FIG. 4 looking outwardly), and the latch or keeper pin 67a is clearly accessible through its adjacent and aligned end panel slot 63. Thus, opposite sides of each end member 53 are provided with the male latch hook device 65 and the cooperating keeper pin element 67. It will be understood that as the latch end 65b is swinging over and into locking engagement around the latch pin 67a, the eccentric cam disc 65c is moving the hook plate 65a longitudinally to firmly interlock the latching elements 65 and 67 and draw the opposed end panels 54 (and entire modular counter units) toward each other so that the mating edge profiles 45 of the countertops 40 will be engaged and held in secure aligned abutment.

It is now readily apparent that the modular countertops 40 of the upper level tier UL are adapted to be releasably secured together in aligned end-to-end assembly to form a substantially continuous countertop system CL, as in FIGS. 1 and 1A. The alignment of adjacent counters is enhanced by dual orienting or keying guide means 68 on opposed end panels 53. As shown best in FIGS. 4, 5 and 5C, each end panel 54 is punched with two spaced openings 68a, and one of these is provided with a tapped mounting plate 68b threadedly receiving an outwardly projecting orientation guide stud or key member 68c having a beveled entry end 68d. The oppositely projecting studs 68c from opposing end members 53 of adjacent counter units have a close tolerance fit in the mating openings 68a therefor, so as to precisely orient the counter units for interlocking engagement of their respective latch mechanisms 51 with the countertop profiles in alignment. It will be noted, with reference particularly to FIGS. 5 and 5C, that the outer surface (54) of the main frame end panel 53 is recessed, at 69, inwardly of the end margin 45 of the countertop 40 in order to accommodate an end dress or cover plate (90) to be applied adhesively for dressing off the outer exposed end of an upper-tier line of counter units UL. This small spacing does not diminish the structural support of the end members 53 and their flanges 54a and 54c for the countertop at the outer end margin 45 thereof.

It will be recognized that the functional requirements of certain foodservice equipment dictates that different countertop configurations are needed for different purposes. Except as noted, these different countertops all utilize the same modular main frame 50, and utilize the interlocking latch means 51 and continuous mounting track or rail structure 52 for the two-tier system (UL-LL). Some differences in countertop units involve the mere addition of structure. For instance, the starter station 20 may be a basic table top unit (as 21) to which is provided a multi-compartment bin 71 for organizing tableware, i.e. knives, forks and spoons (not shown). Although not shown, this station typically is provided with a tray rack or shelf in its base.

Figure 8:
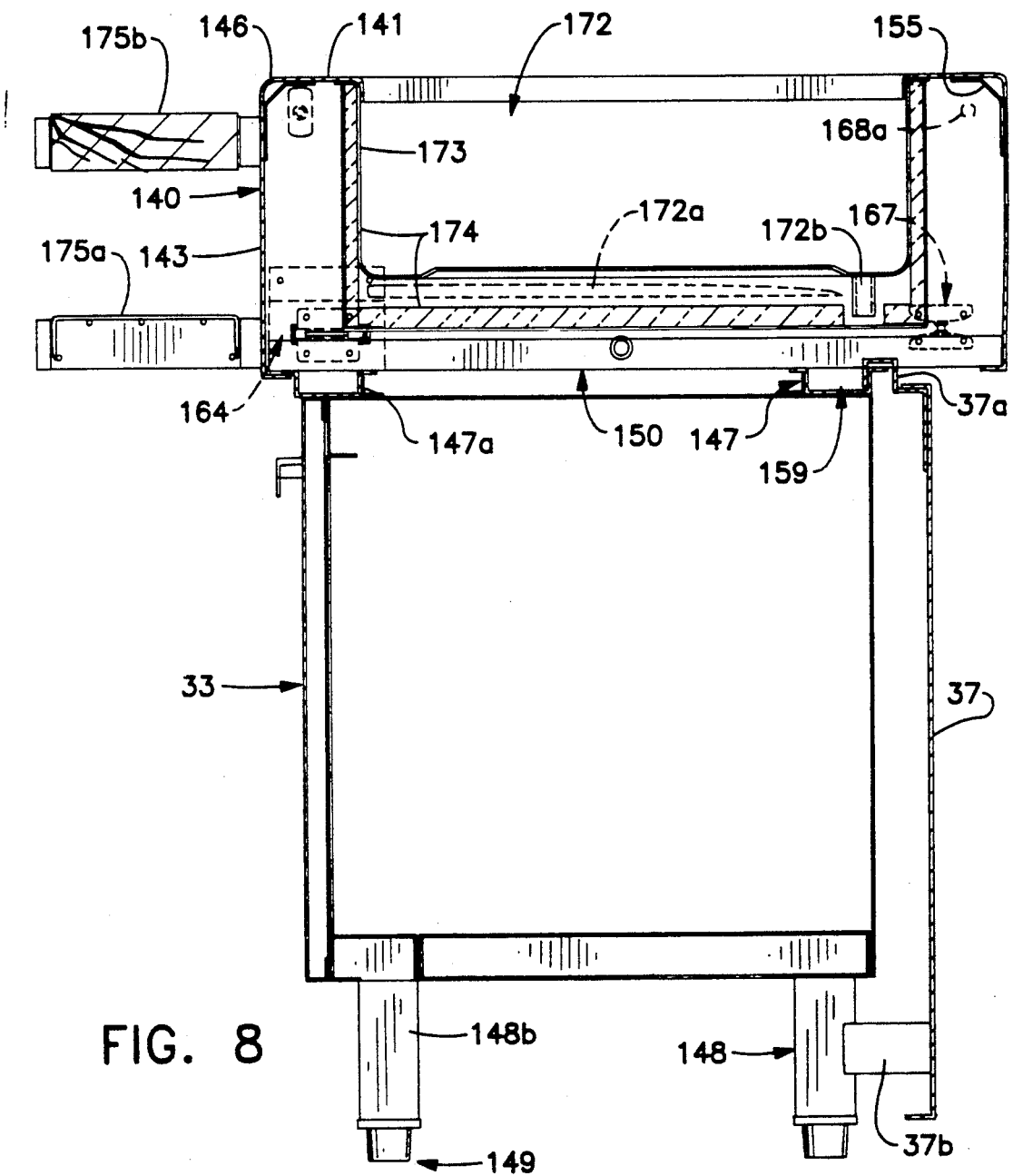
FIG. 8 is another vertical sectional view taken along line 8—8 of FIG. 1, showing another form of modular counter unit and supporting cabinet base.

Referring to FIGS. 1, 1A and 8, the hot food table 22 (referenced and identified by "100" series numbers) has a modular main frame 150 and countertop 140. The horizontal upper wall 141 is provided with a plurality of separate food compartments or wells 172 defined by stainless liners 173 recessed within the open interior of the main frame 150 and having insulated walls 174. This part of the structure and the heating elements (172a) and/or drainage (172b) therefor may be conventional. As shown in FIGS. 1 and 1A, an electric control panel 175 may be provided on the vertical wall 143 on the service side of the cafeteria line CL to control the infrared heating elements 172a or the like, and a conventional plate shelf 175a and cutting board 175b may also be provided. It will be understood that the cold pan unit 24 is similar to the hot food unit 22 in providing a recessed insulated well 272 (with drain 272b) for holding iced food products or, alternatively, being provided by a self-contained refrigeration unit 277 for a cooling coil (not shown). It will be understood that the hot food unit 22 and cold pan unit 24 are constructed and arranged so that the horizontal wall sections 141 and 241 of the countertops 140 and 240 are reinforced by the well compartment structure (172, 272) without requiring strut members (57) or other intermediate structural support.

Figure 10:
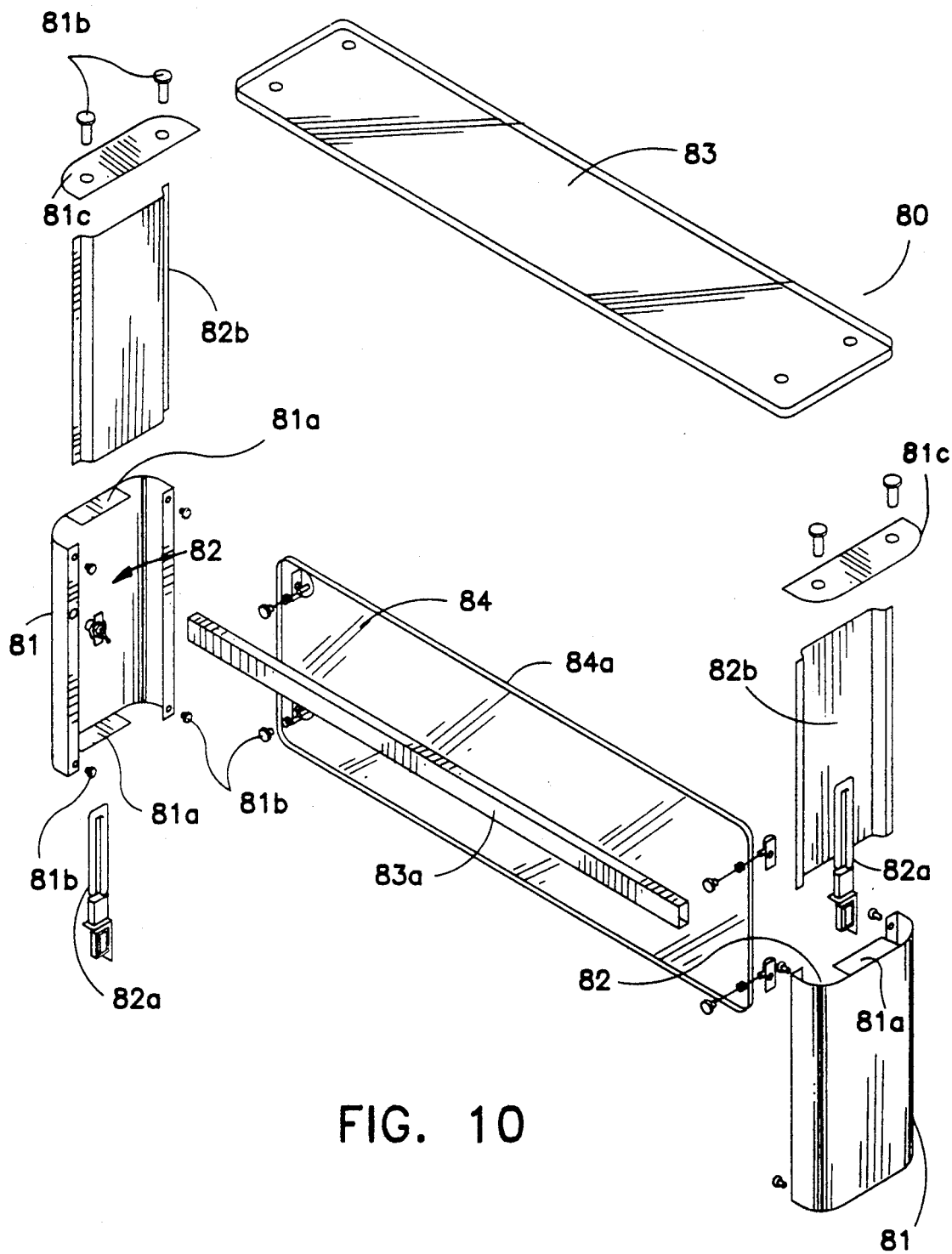
FIG. 10 is an enlarged exploded diagrammatic view of a sneeze protector guard for a modular counter unit.

The hot food unit 22 has a sneeze guard or protector shield 80 mounted on the horizontal wall section 141 of its countertop 140, and the cold pan unit 24 has a similar sneeze guard 280 (with a display shelf 285). The sneeze guard 80 (see FIGS. 1 and 10) for the hot food unit 22 includes outer opposing support columns 81 with mounting flanges 81a removably attached to the countertop by self-threading fasteners 81b having large knurled heads for manual application. Each column 81 is generally concave or channel-shaped, at 82, and houses an electric bulb 82a covered by a light diffuser 82b for illuminating the countertop 22. An upper plate 83 of transparent material is removably attached through plates 81c to the top column flanges 81a by knurled fasteners 81b and is additionally supported by a bar 83a extending between the columns 81 on the service side. A vertical forwardly facing guard plate 84 of transparent material is attached to the front or customer side of the columns with its upper edge 84a being closely adjacent the upper plate 83 to form a barrier.

Figure 11:
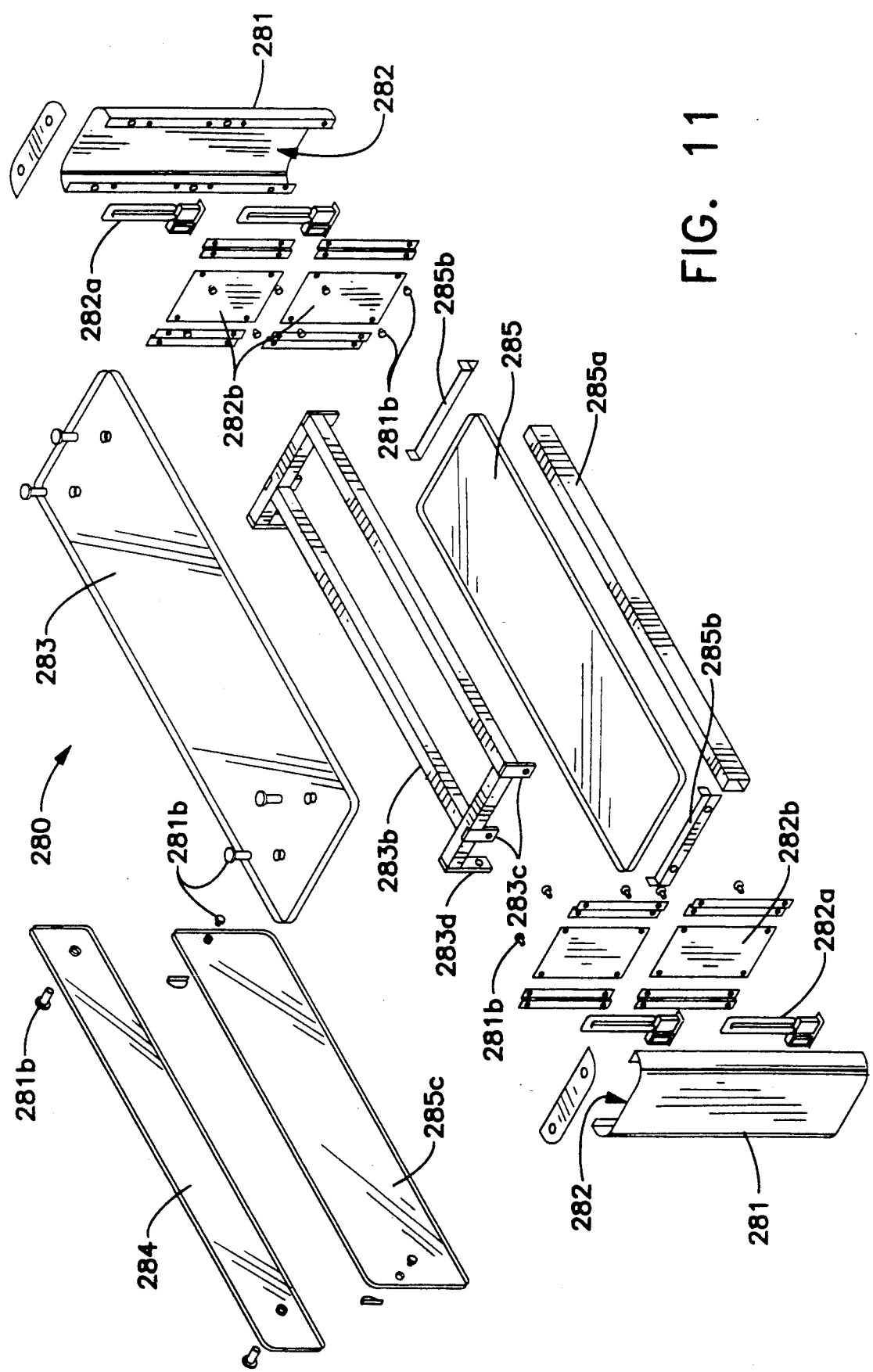
FIG. 11 is a diagrammatic view similar to FIG. 10 of another form of sneeze guard.
Figure 11A:
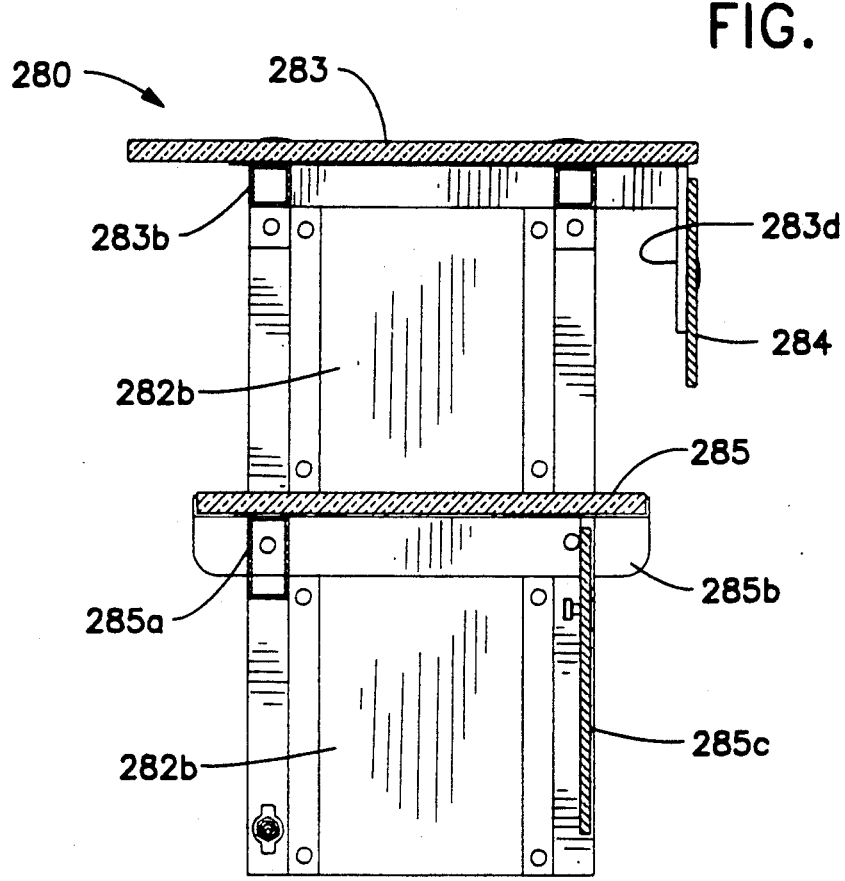
FIG. 11A is a vertical sectional view of the protector guard of FIG. 11, as taken substantially along line 11A—11A of FIG. 1A.

As shown in FIGS. 11 and 11a, the sneeze guard 280 mounted on the cold pan unit 24 is of similar construction including opposing support columns 281 housing lights 282a covered by diffuser plates 282b. However, in addition to an upper transparent cover plate 283 mounted on a horizontal framework 283b having support tabs 283c received between the columns, the sneeze guard has a lower shelf 285 secured by bar 285a and brackets 285b to the columns 281. A first forwardly facing transparent guard plate 284 is mounted on a bracket 283d of the framework 283b located near the upper plate 283 to protect the lower shelf 285 without entirely blocking access from the customer side. A second forwardly facing guard plate 285c is mounted on the support columns to protect the area between the lower shelf 285 and the countertop 241. The sneeze guards 80 and 280 can be assembled and/or mounted on their respective countertops 141 and 241 of the hot and cold units 22 and 24, respectively, or disassembled and/or removed therefrom without the use of tools through the provision of the manual fasteners 81b, 281b having enlarged, knurled heads which may be turned by hand.

The beverage counter unit 26 has a grated opening 89 in the counter wall 341 with a fluid take-off drain trough (not shown) accommodated within the main frame for the passage of spilled or overflow beverages. The end wall member (53) and finish dress plate 90 of the checkout station 27 are constructed and arranged to accommodate a cash drawer 90a slidably mounted in the main frame (not shown) in a typical manner.

Figure 9:
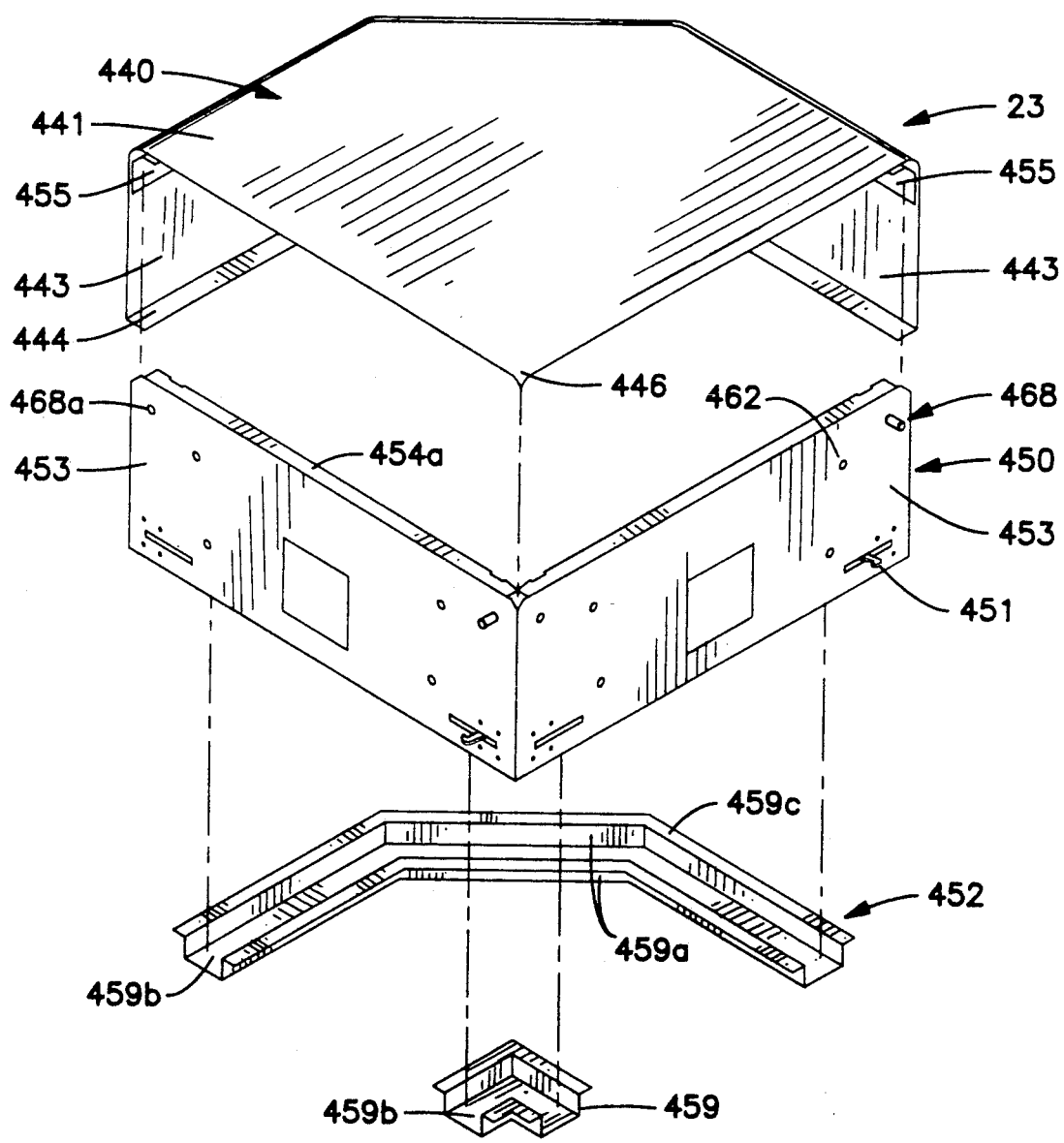
FIG. 9 is a partially exploded diagrammatic perspective view showing another form of modular counter unit according to the invention.

Referring to FIGS. 1, 1A and 9, the inside and outside corner units 23 and 23A may be utilized to turn the direction of the cafeteria line CL when necessary or desirable due to room size, traffic flow, service requirements or the like. Each corner unit 23, 23A has a unitary countertop 440 formed from a one-piece blank with integrally formed horizontal and side wall members 441 and 443 as a feature of the modular unit. The outer side wall 443 may be sectioned or partitioned and vertically seamed (at 443a) to bevel off the corner, and the inside corner edge may require a short seam or otherwise be rounded (446) to accommodate and match the radius bend profile of the adjacent mating countertop units (22 and 21A). The modular aspects of the main frame 450 are also found in the end wall members 453 and their interlocking latch means 451, and the orienting pin means 468, 468a. The interconnecting frame members 455 in these units 23, 23A are segmented and angularly arranged and joined to form the desired bend. If deemed necessary, this corner unit 23, 23A may utilize supplemental reinforcement or structural support (not shown) across its open beveled side spaced from the end walls 453 or underlying the countertop 441.

The self-service selector case, shown in FIGS. 12-15, generally comprises a refrigerated display zone for holding and displaying prepared food products requiring refrigeration in the temperature range of about 35° F. to 50° F. The selector case (identified and referenced by the "500" series) utilizes a modular countertop unit 540 that is of similar construction to the hot food and cold pan units 140 and 240, in that the horizontal wall section 541 has a well 572 formed in it, and the modular main frame 550 with latch and track means 551 and 552 is substantially identical. The well 572 is defined by side walls 576a and a bottom wall 576b, which are insulated (574) to reduce heat transfer from the refrigerated zone. The selector case 25 also utilizes a multi-level display superstructure 91 removably mounted on the modular countertop 540 and being constructed and arranged to form a system of refrigerated air distribution throughout its interior product display zone 91a. The modular countertop 540 is constructed to house the refrigeration and air moving means for this air distribution system, as now described in detail.

Figure 15:
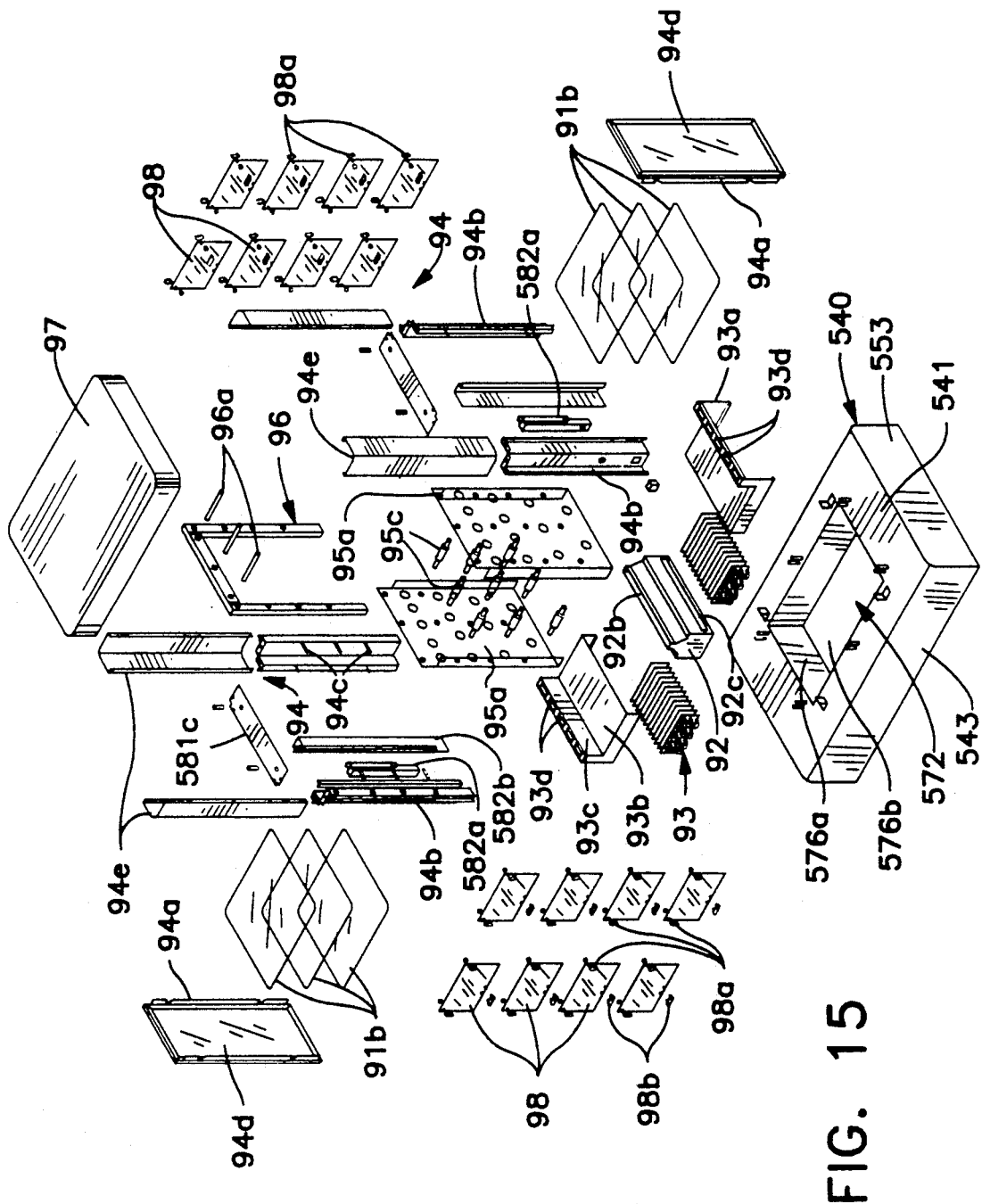
FIG. 15 is an exploded diagrammatic view of the selector case unit.

As shown in FIGS. 12 and 15, a fan housing 92 is centrally disposed across the well 572 for housing one or more fans 92a or like air movers. The housing 92 has an elongated central air discharge slot 92b and opposed intake air openings 92c in its opposed lower side walls 92d. A pair of parallel piped refrigeration coils 93 are disposed on each side of the central housing 92, and the coils are covered by coil housings 93a having solid upper plates 93b extending across the well 572 from side to side above the coils and from the central housing 92 to the respective end walls 576a of the well. The end sections 93c of the coil housings form vertical channels having inlet openings 93d thus, along with the well, defining air return passages 93e to the cooling coil chambers 93f and thence into and through the fan housing 92 for distribution of refrigerated air to the selector case superstructure 91. It may be noted that the refrigeration system condensing unit per se (not shown) for cooling the evaporator coils 93 or setting its operating temperature forms no part of this invention, but may be housed in the self-contained base unit 35.

Figure 13:
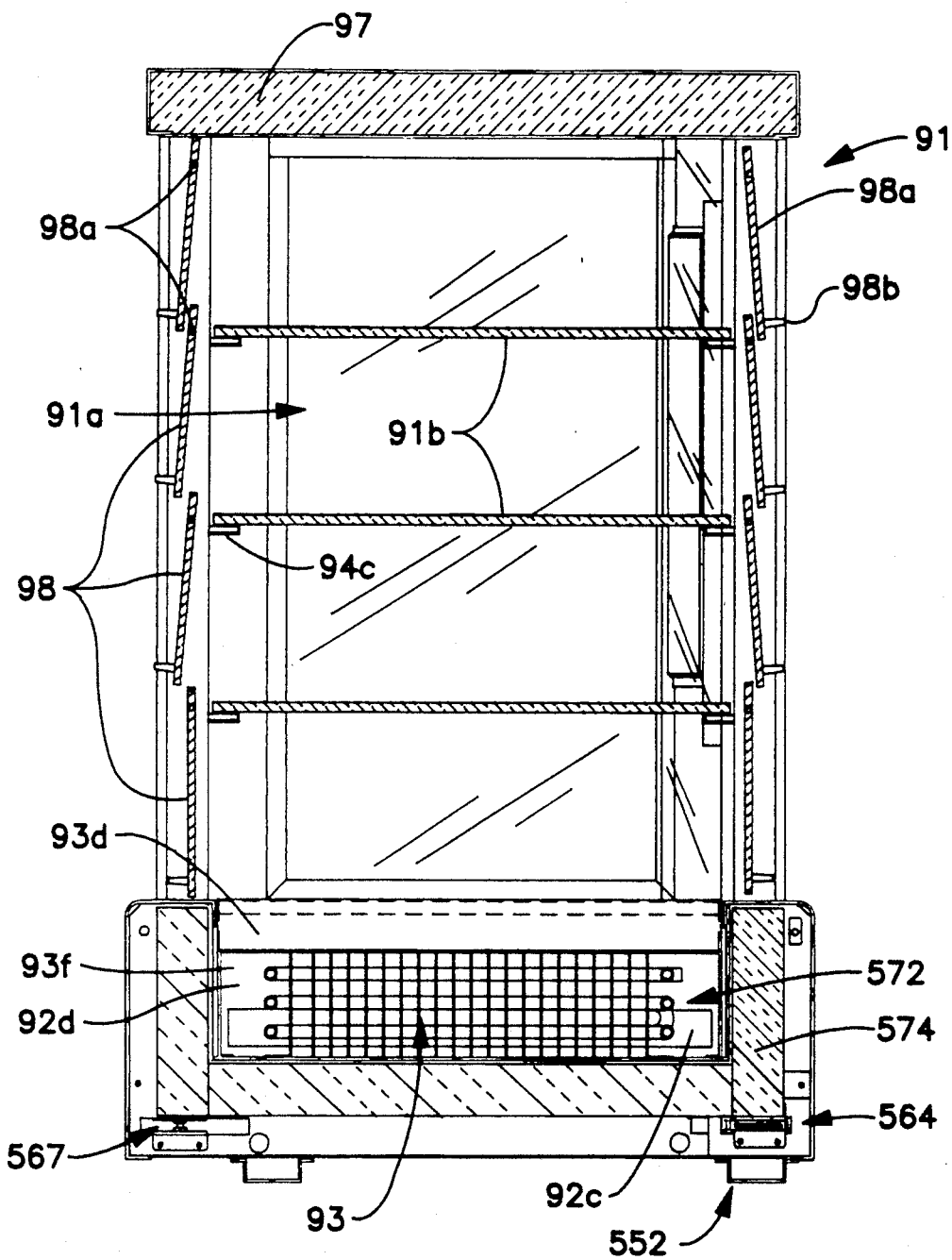
FIG. 13 is a vertical section taken substantially in the plane of line 13—13 of FIG. 1A.
Figure 13A:
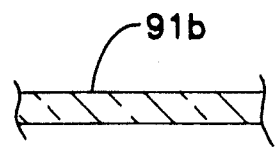
FIG. 13A is a greatly enlarged fragmentary cross-sectional view of a selector case shelf.
Figure 13B:
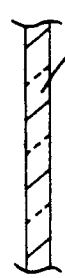
FIG. 13B is a greatly enlarged fragmentary cross-sectional view of a selector case door panel.
Figure 14:
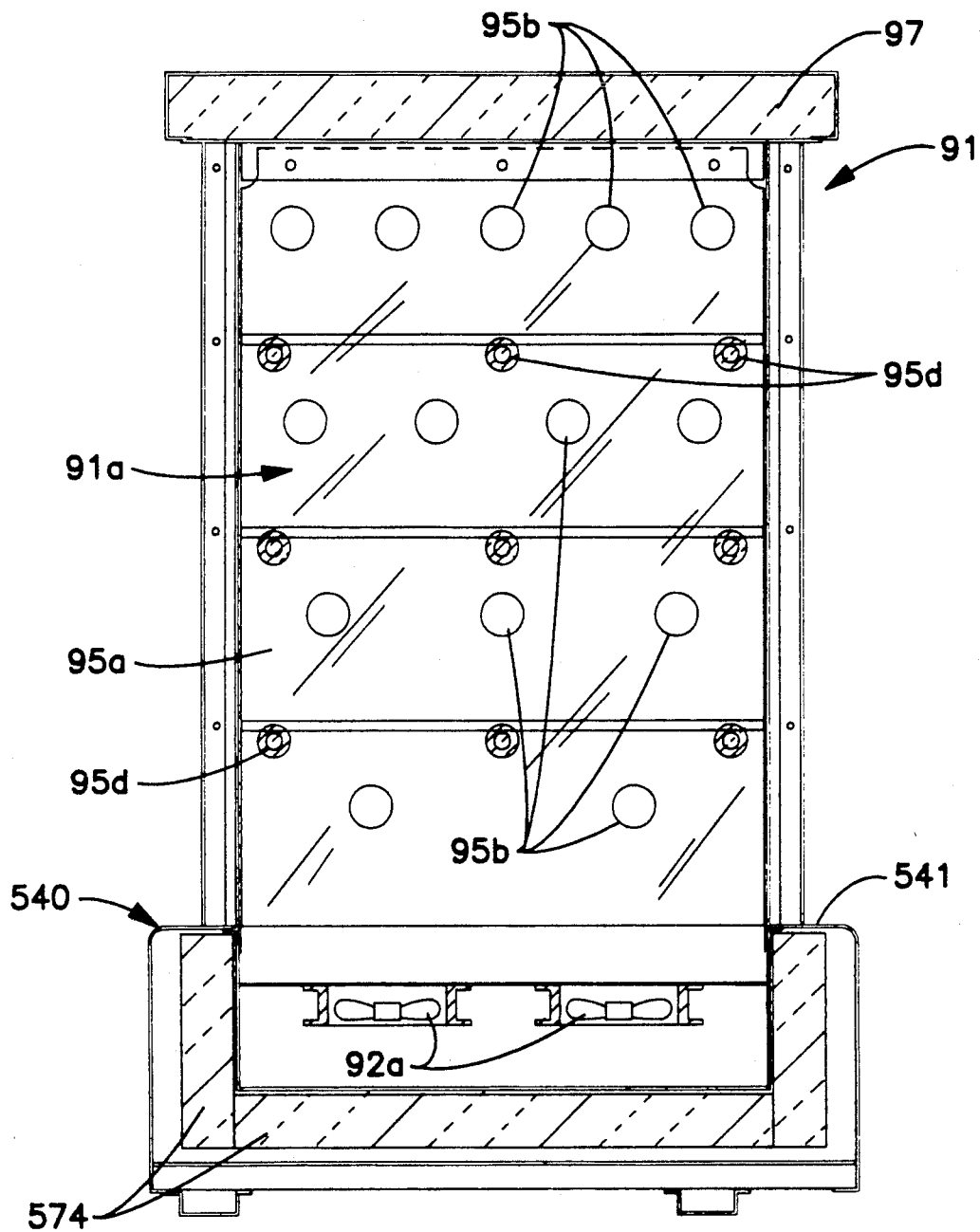
FIG. 14 is a view similar to FIG. 13, but taken along the central plane of line 14—14 of FIG. 1.

The display zone 91a of the selector case unit 25 includes two longitudinally spaced compartments, each being divided into multiple vertically spaced sections by shelves 91b preferably of transparent material, FIGS. 12A and 13A. In fact, one feature of the selector case superstructure 91 is the use of transparent material, such as plexiglass or the like, substantially throughout so as to provide the fullest visibility of the food products therein. Another feature, to be discussed, is the general use of thumbscrew or like manual fasteners to permit the superstructure to be disassembled for cleaning and reassembled in a quick, simple process without using special tools of any type.

Referring to FIG. 15, the selector case superstructure 91 comprises four metal corner support columns 94 with corner members 94e and stanchion extrusions 94b having end pins 94c removably receiving bayonet slots of window frame members 94a for thermopane end windows 94d (FIG. 12B). The interior extrusion 94b has vertically spaced shelf support pins 94c, and each stanchion 94b also accommodates a fluorescent lamp 582a having light diffuser 582b. The display areas 91a are spaced by a central air distribution duct 95 defined by spaced panels 95a having plural rows of air outlet openings 95b at respective levels for the shelves 91b. It will be noted in FIG. 14 that the lowest shelf area (above the upper wall 93b of the coil cover) has only two air discharge openings whereas the progressively higher shelves 91b have additional air discharge capability whereas to substantially evenly balance out the air flow throughout the entire superstructure. The central duct panels 95a are assembled on a central spacer frame 96 of inverted U-shape configuration and are also spaced by plural transparent spacer members 95c each having a large cylindrical center 95d and smaller shelf pins 95e oppositely extend therefrom and form abutment shoulders 95f. FIG. 12 shows that the spacers 95c extend between the panels 95a and seat them against shoulders 95f with the shelf pins 95e extending into the compartments 91a. Fasteners may be provided to secure this center duct assembly, although the shelves 91b per se abut the duct panels and hold them in place against the shoulders 95f thereby facilitating rapid disassembly for cleaning. From FIG. 15 it will also be seen that the bottom edges of the center duct panels 95a are seated against a shoulder of the fan housing 92 adjacent to the air discharge slot 92b, and the top portions of the duct panels 95a may be releasably held on by pins 96a to the center frame 96.

The end pairs of corner channels 94e have a top cover plate 581c, and the entire superstructure 91 is capped by an insulated top or cover panel 97 having depending flanges 97a at its longitudinally opposite ends. The end wall panels 94d abut against the flanges 97a adjacent their upper edges to seal the display areas 91a. As shown in FIGS. 13 and 15, a series of self-service transparent louvered doors 98 are used to cover the compartment sections on both the customer side and the service side of the selector case so that refrigerated foods or beverages may be placed on the shelves 91b from the service side and then accessed by the customer from the customer side. Each door 98 has upper corner hinge pins 98a that journal into the corner extrusions 94b and the opposed side edges of the spacer frame 96 and are removable from the doors 98 by thumbscrews.

In operation, the fans 92 draw return air across the coils 93 and discharge this refrigerated air vertically from the fan housing 92 into the air passageway 95 thence laterally through the rows of openings 95b in the duct panels 95a into and across the compartment sections. The fans are sized to maintain a constant pressure in the air duct plenum 95 so that the volume of air to each compartment section is substantially the same. The return air circulates down the outer end wall panels 94d to the air return passageways 93e and is recirculated across the refrigeration coils 93 for recooling.

The superstructure 91 of the selector case 25 may be easily and quickly disassembled and reassembled without the use of tools for cleaning, transportation or storage. The top panel 97 is releasably connected at the corner columns 94 on which it rests by normally removing enlarged knurled fasteners 97b connected through the top plates 581c, and lifting the top panel upwardly. The end windows 94d may then be lifted upwardly and out off the end pins 94c of the corner columns 94. The transparent panels of the louvered doors 98 are removed by loosening knurl headed set screws so that the transparent panels slide out of the hinge pin keeper portion 98a. The shelves 91b are removed by lifting them off the end pins 94c and spacer pins 95e supporting them, and then out of the compartments 91a. Having thus removed the exterior walls of the superstructure and the shelves 91b, the center duct panels 95a can be pulled apart, with the spacers 95c being removable from the center duct panels. The center frame 96 and corner support columns 94 are fastened to the countertop 541 by thumbscrew fasteners of the same type already discussed and, when these fasteners are removed, the center frame 96 and corner columns 94 are lifted off the countertop 541. The coil covers 93b and fan housing 92 is removable from the well 572 so that all portions of the selector case can easily be cleaned on a regular maintenance schedule. However, it is to be understood that for intermediate cleaning purposes, the superstructure may be broken down only so far as required to access necessary portions. It is, moreover, apparent that the superstructure may be easily reassembled without the use of tools by reversing the procedure just described.

Figure 16:
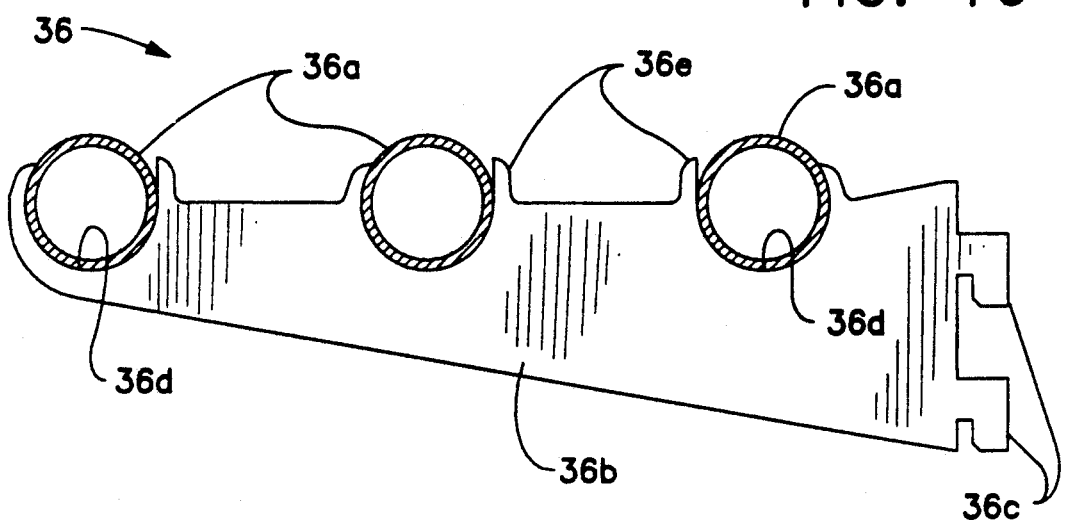
FIG. 16 is a cross-sectional view of a tray slide taken along line 16—16 of FIG. 1.

Referring again to FIGS. 1, 1A, 2, 8 and 16, the exposed customer side of the cafeteria line CL will normally be dressed off by a finish panel or skirt 37 releasably hung on upper and lower brackets 37a and 37b to hide the lower tier base units LL. The customer side is also provided with the continuous tray slide 36 (FIG. 16), which in its simplest form comprises a plurality of spaced and substantially parallel tubular members 36a slidably supporting food trays (not shown) on their upper surfaces. When circular in cross-section, as shown, these tubular members present only a series of line contacts to the trays thereby reducing friction and problems with spilled food. Although the ends of such tubular members may be telescoped, it is preferred to merely bring the mating ends of adjacent members into edge abutment and such assembly is facilitated by a mounting bracket 36b which is removably attached to the outer customer side surfaces by bayonet hooks 36c received in keeper brackets or slots (not shown) in a typical manner well known in the art. However, the tubular slide members 36a may be assembled onto the mounting brackets in situ. The brackets 36b have recessed channels 36d complementary to the tubular configuration of the members 36a, and upstanding tangs or ears 36e are integrally formed as channel extensions on each side of these channels. The bracket 36b is formed of a plastically deformable or swageable material that permits the ears 36e to be easily bent inwardly to close upon and grip the outer surface of the tubular member 36a and hold it firmly seated onto the bracket 36b. Clearly this facilitates end-to-end alignment and assembly, and substantially eliminates customer injury, such as pinched fingers, through loosely joined and held tray slides and brackets.

Before describing the lower level base units LL of the two-tier system, reference is had briefly to FIGS. 2 and 2A showing a chef's fixture or back bar foodservice unit 99 for use in a commercial kitchen. This typical back bar unit 99 (further referenced by the "600" series) has the same basic modular main frame 650 already described, and a similar countertop 640. However, this unit is designed to be set against a wall in a kitchen service lineup rather than be free standing for dual service from both sides as in a cafeteria or buffet line (CL). Accordingly, the basic countertop 640 is modified such that one of the vertical wall sections 643a (shown in phantom in FIG. 2) is configured to extend upwardly from the side margin (642) of the horizontal wall section 641 to define an integral backsplash structure. The backsplash structure may be channel-shaped as shown to form a utility distribution raceway (at 643b) for accommodating electrical lines (not shown) connected to outlets 643c or other utility service normally required in a commercial kitchen layout, such as water, steam or gas lines. The raceway may be closed by an appropriate panel 643d in any typical manner. It will be understood that the modular back bar counter unit 640 of FIG. 2A (and its lower base cabinet unit 633) is shown by way of example of the application of the present invention to various types of commercial foodservice equipment. A typical kitchen layout in addition to ovens, dishwashers, refrigerators, freezers and like appliances, might include deep fat fryers, griddles, ranges, cutting boards and other food preparation or processing stations capable of being incorporated into the modular counter unit (UL) of the present invention.

Referring particularly to FIG. 1A, it has been seen how the modular countertop units (UL) of the upper tier are quickly and easily assembled by bringing the opposed end members 53 of adjacent countertops (40, 140, 240, 340, 440, 540) together by orienting the mating keying means 68 to align the matching profiles of these countertops. The latching means 51 are then manipulated to interlock the adjacent units together to form substantially continuous top and side wall countertop surfaces. Thus, the upper level UL of the modular counter units can be assembled and interlocked in any arrangement of the different units and independently of any supporting base structure. The modular counter units of the upper level UL can also be easily unlocked and separated for relocation, if necessary for any purpose. However, if a more permanent installation is desired, the modular units can also be bolted together in a conventional manner by using the aligned holes 62 in opposed end frame members (54), see FIG. 5.

It has also been seen that the mounting means 52 of the present invention, in its simplest form comprises a pair of track channels or rails 59 secured in predetermined laterally spaced relation to extend below or depend from the main frame 50 and also function as part of this main frame structure. Thus, when the countertops of adjacent units UL are assembled in aligned condition, the longitudinally extending track channels 52 thereof are also aligned and form a continuous track so that the lower level supporting base means LL may be selectively placed anywhere along the length of the connected counter units. Since the countertop units do not each incorporate their own fixed support, the user is permitted to select and adjustably position a wide range of types of lower base supports as deemed necessary for the user's particular application.

Figure 7:
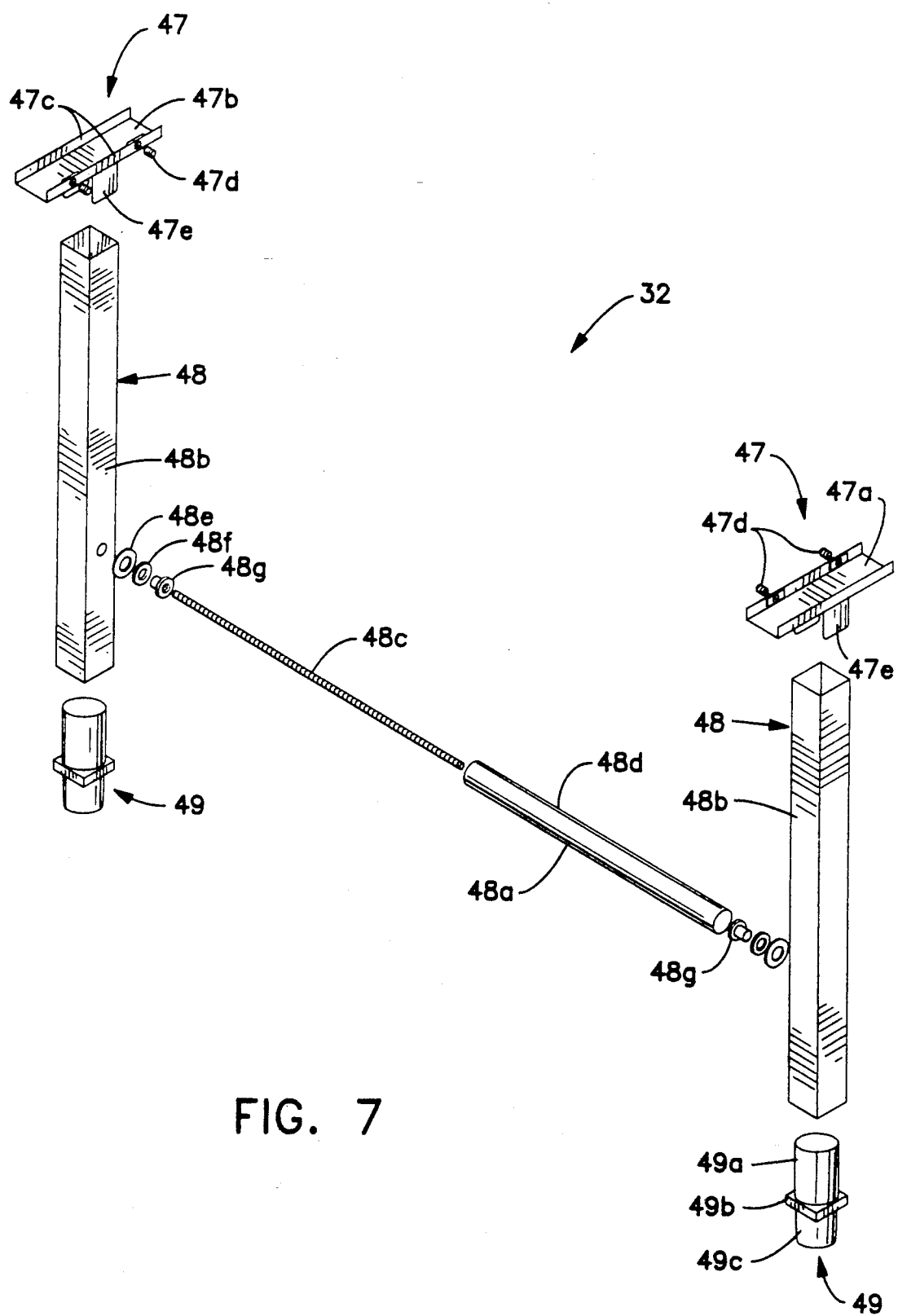
FIG. 7 is an enlarged diagrammatic and exploded perspective view of a dual leg assembly.

Referring to FIGS. 6 and 7, each supporting base leg or unit (32, 31) of the lower level tier LL of the present invention has cooperable mounting means 47 for locking engagement with the parallel channel rail means 52 of the countertop units (40). Again, in its simplest form, the basic mounting means 47 comprises an elongated channel member 47a having a bottom wall 47b and opposed side walls 47c. Clearly, the channels 47 of the dual leg assembly 32 (FIG. 7) are constructed to slidably receive the spaced rails 59 of the mounting means 52 and mounting fasteners 47d, such as set screws, are provided for securing these mounting means 52, 47 together in the selected position of the base unit LL. It will be understood that the outer longitudinal side walls 59a of the mounting tracks 59 may be horizontally grooved or indented throughout their length to receive the set screw fastener 47d into such recess and thus hold the countertop and base units in preassembled condition against vertical displacement while permitting longitudinal positioning of the base relative to the countertop prior to tightening the set screw 47d in final assembly.

One basic support unit LL is the dual leg assembly 32 (FIGS. 1A and 7), which includes a pair of legs 48 of predetermined length (base depth) connected together by a laterally extending cross piece or rung 48a. Each leg 48 comprises a tubular body portion 48b provided in its lower end with a leveling foot member 49. The channel member 47a has depending flanges 47e inserted into the upper end of the body portion 48b and being secured by pop rivets (not shown). The cross piece 48a connecting the legs 48 includes an elongate threaded rod 48c covered by a tubular sheath 48d. The ends of the rod are threadedly and rotatably received in the leg body portions 48b. A nylon washer 48e larger than the sheath 48d seats its ends against the leg body portions 48b, and next a metal washer 48f fits within the sheath 48d and seats a deformable anchor 48g of zinc or the like that is flared during assembly within the leg body portions 48b. The foot member 49 comprises an upper tubular member 49a having a press fit within the lower end of the body portion 48b and carrying an enlarged base 49b to engage this lower end. The upper member 49a is internally threaded and an adjustable lower leveling member 49c is received therein.

The compound leg assembly 31, shown in FIG. 6, includes two dual leg assemblies 48 which are further rigidly connected together by longitudinally extending rungs or braces 48h. As shown in phantom in FIG. 6, the threaded rod mounting arrangement of the paired legs (FIG. 7) permit each leg assembly 32 to be folded down so that they both lie in the same plane as the cross rungs 48a and longitudinally extending braces 48h. This makes the compound leg assembly compact for easy transportation and set up at the desired location. Thus, because the hat channels 59 of adjacent, connected counter units UL form continuous mounting track means 51, the dual leg assembly 32 or compound leg assembly 31 may be positioned nearly anywhere along the length of the connected upper tier of counter units UL including the juncture of two adjacent counter units. It is clear that the open shelf unit 30 and the wire shelf unit 34 are modifications of the compound leg assembly 31 in which a shelf 30a, 34a is connected to the cross rungs and braces 48a, 48h of the component leg assemblies 48. The leg assemblies 32, 31 are relatively inexpensive so that a countertop without additional storage space (refrigerated or otherwise) under the countertop may be provided at minimal expense to the user.

The other base defining units of the lower tier LL are constructed and arranged to have mounting means 147 for selective positioning relative to the upper tier of countertops UL. For instance, the cabinet base 33, the refrigeration base 35 and the like are each provided with indexing means 147a for engagement by opposed sides of the upper mounting channels 59 thus permitting random or selective base placement arrangements and open unsupported areas below the upper tier. It will also be clear that all base units LL are provided with leveling legs 149 as indicated in FIGS. 1 and 8. As a matter of sound engineering some of these base units will naturally be assembled in subjacent position to a specific counter unit serviced thereby. For instance, the condensing unit of the self-contained refrigeration system for the selector case 25 will typically be housed in the refrigeration base unit 35 immediately below the selector case to provide the shortest liquid and suction line connections to the evaporator coils 93, as will be understood. Similarly, if the cold unit 24 is a frost-top cooler, it will also have a refrigerated base unit 35 and a low temperature freezer 35a may also be closely associated with such a unit for the storage of ice cream or other frozen products not usually openly displayed.

From the foregoing, it will be seen that the objects and advantages of the present invention are embodied in the modular commercial foodservice equipment having modular top-defining counter units for accommodating a full range of foodservice functions and constructed for interlocking relationship in an aligned continuous upper tier counter lineup; and in the two-tier system accommodating selective independent placement and orientation of both the upper-tier lineup of units and the organization of supporting base units of the lower-tier. The invention is intended to cover all changes and modifications readily apparent to those skilled in the art, and is to be limited only by the scope of the appended claims.

What is claimed is:

1. A modular top-defining foodservice unit constructed and arranged for interlocking relationship with at least one other top-defining unit to form an aligned, substantially continuous upper level tier of counter units adapted for receiving the selective placement of underlying base means throughout its length, said modular unit comprising:

a countertop having an upper substantially horizontally disposed wall section with spaced side margins and at least one substantially vertically disposed wall section integrally formed from one of said side margins, said horizontal and vertical wall sections having contiguous outer end margins, an open support frame for said countertop including transverse end frame members underlying said countertop adjacent to the end margins thereof, and at least one longitudinal frame member interconnecting said end frame members and being constructed and arranged for the structural engagement and support of said countertop substantially at the juncture of the horizontal and vertical wall sections whereby to provide a substantially unrestricted open area between said end margins for accommodating different countertop configurations including those having recessed wells extending below said horizontal wall section, and means for securing said countertop to said longitudinal and end frame members of said open support frame, said open support frame further including mounting means constructed and arranged to extend longitudinally between said end frame members and be secured thereto at a preselected transverse location for longitudinal alignment with the mounting means of adjacent counter units, when assembled, to thereby accommodate the selective longitudinal placement and attachment thereto of an underlying supporting base unit including cabinet and leg means, and latching means on said support frame adjacent to at least one transverse end member and being constructed and arranged for releasable interlocking engagement with an adjacent top-defining unit.

2. The modular top-defining unit according to claim 1, wherein said horizontally and vertically disposed wall sections of said countertop are connected by a radius bend forming a non-angular curved corner therebetween, said longitudinal frame member having a horizontal attachment flange and a vertical attachment flange respectively secured to the horizontal and vertical wall sections immediately adjacent to said curved corner, said longitudinal frame member further comprising beam means rigidly interconnecting said flanges and being angularly disposed therebetween in spaced relation with said curved corner to form angular bridging means across said corner whereby loads on said horizontal countertop wall are translated into said support frame and vertical wall section by both said curved corner and said beam means.

3. The modular top-defining unit according to claim 1, in which said countertop has another vertically disposed wall section integrally formed from the opposite longitudinal side margin of said horizontal wall section from the first said vertical wall section, and said support frame includes laterally spaced longitudinal side frame members in supporting position with said horizontal wall section substantially at both longitudinal side margins thereof.

4. The modular top-defining unit according to claim 3, in which said horizontally disposed wall section of said countertop is substantially planar, and said support frame includes longitudinally disposed structural support means extending between said end frame members intermediate to said side frame members for reinforcing said horizontal wall section.

5. The modular top-defining unit according to claim 3, in which said countertop and the support frame thereof are constructed and arranged with substantially identical and opposed vertical side walls and end frame members, respectively, whereby to provide a reversible modular structure.

6. The modular top-defining unit according to claim 1, in which said latching means comprises first and second locking elements adapted for cooperable interlocking engagement, and each end member of said support frame being provided with one each of said first and second elements mounted in predetermined locations and adapted for releasable interlocking engagement with similar locking elements of another modular top-defining unit.

7. The modular top-defining unit of claim 6 in which said first locking element comprises a latch plate having a hook end and said second locking element comprises a latch pin, said first locking element including means for moving the hook end from a remote position into locking engagement with the latch pin of another modular unit.

8. The modular top-defining unit according to claim 7, in which said first and second locking elements are secured at their predetermined locations to the inside of each end frame member in operative association with adjacent horizontal slots formed in said end frame member, said latch plate being movable in a horizontal plane from a remote position behind said end member to extend outwardly through its associated slot, and said latch pin being mounted in vertical disposition behind its associated slot and being arranged to lockably receive the outwardly extended latch hook end from an adjacent modular unit.

9. The modular top-defining unit of claim 1, in which said mounting means comprise first and second longitudinally disposed track means secured between said end frame members in predetermined laterally spaced positions and being adapted for releasable locking engagement by a base unit selected from a lower level tier of cabinet and leg means.

10. The modular top-defining unit of claim 1, in which said end members of said support frame include vertically disposed end panels having horizontal and vertical flange means in supporting relationship with the horizontal and vertical wall sections of said countertop adjacent to the outer end margins thereof, and adhesive means for securing said end panel flange means to said countertop wall sections.

11. The modular top-defining unit according to claim 1, in which said outer end margins of said horizontal and vertical wall sections are contiguous, and said end frame members having outer wall surfaces recessed inwardly from the outer end margins, and at least one of said vertical panels being adapted to receive a finish end panel thereon.

12. The modular top-defining unit according to claim 1, in which said support frame defines an open interior space accommodating different commercial food service countertops and being selected from a class comprising a back-bar or shelf's counter, a starter station counter, a surface counter, a hot food counter, a cold pan counter, a selector case supporting counter, a beverage dispensing counter, a corner counter, and a cashier's counter.

13. The modular top-defining unit according to claim 12 wherein said unit comprises a back-bar counter in which said one vertical wall section defines an access side of said countertop, and said countertop includes an upwardly turned vertically disposed wall section integrally formed from the other side margin and defining a rear side of said countertop, said upwardly turned wall being constructed and arranged to house a utility service raceway.

14. The modular top-defining unit according to claim 12 wherein said unit comprises a starter station for a cafeteria or buffet counter lineup in which said one vertical wall section defines a customer side of said countertop, and said horizontal wall section includes holder means for tableware.

15. The modular top-defining unit according to claim 12 wherein said unit comprises a table top surface counter for a cafeteria or buffet counter lineup in which said horizontal wall section comprises a substantially planar work surface extending between said laterally spaced side margins, and two vertically disposed wall sections integrally formed along the spaced margins of said horizontal wall section to extend downwardly therefrom.

16. The modular top-defining unit according to claim 12, wherein said unit comprises a food display counter and in which said horizontal wall section is constructed and arranged with at least one well having its walls recessed downwardly into the open interior space defined by said support frame.

17. The modular top-defining unit according to claim 16, in which said unit comprises a hot food counter having a plurality of food-holding wells, means for heating said wells, and means for insulating said heated wells.

18. The modular top-defining unit according to claim 17, in which said one vertically disposed wall section defines a customer access side of said countertop, and said hot food counter includes a protector guard constructed and arranged to shield the food display wells thereof from the access side, said protector guard including vertical support columns extending upwardly from said horizontally disposed wall section adjacent to the outer end margins of said countertop, horizontal guard means carried by said support columns in spaced position superposed above said wells, and vertical guard means disposed on the access side of said wells, said support columns and said guard means being removably assembled together by manual fastening means.

19. The modular top-defining unit according to claim 16, in which said unit comprises a cold pan counter including means for cooling food products displayed in said well, and means for insulating the walls of said well.

20. The modular top-defining unit according to claim 14, in which said one vertically disposed wall section defines a customer access side of said countertop, and said cold pan counter includes a protector guard constructed and arranged to shield the food display well thereof from the access side, said protector guard including vertical support columns extending upwardly from said horizontally disposed wall section adjacent to the outer end margins of said countertop, horizontal guard means carried by said support columns in spaced relation superposed above said well, and vertical guard means disposed on the access side of said well, said support columns and said guard means being removably secured together by manual fastening means.

21. The modular top-defining unit according to claim 16, in which said unit comprises a selector case supporting countertop including selector case means for providing a controlled environment for the display and dispensing of food products, said selector case means comprising a vertical superstructure disposed above said well and being removably secured to said horizontally disposed wall section, said superstructure having a food zone including shelf means for supporting food products at plural levels, door means for selectively accessing food products at the different levels from at least one side and normally closing the food zone from ambient, conditioning means for environmentally conditioning and distributing air substantially uniformly throughout said food zone, and manually applied fastening means for removably securing said selector case means together in assembled condition.

22. The modular top-defining unit according to claim 21, in which said selector case means provides a refrigerated environment for food products including refrigeration coil means in said well air circulating means for recirculating air including an air delivery duct centrally disposed in said superstructure and dividing the food zone into longitudinally disposed compartments, plural vertically spaced shelves in each compartment, air moving means for delivering conditioned air upwardly in said delivery duct, and duct outlet means constructed and arranged to proportion the air flow laterally from the delivery duct into the compartments and being constructed and arranged to proportion the conditioned air flow substantially evenly at each vertical shelf level throughout the food zone.

23. The modular top-defining unit according to claim 21, in which said conditioning means of said selector case comprises a refrigeration coil disposed in the countertop well for cooling air for distribution to the selector case means, ac oil and fan cover having air return openings for receiving return air from the food zone, an air moving fan for the recirculation of air through the selector case; and said superstructure including duct means extending upwardly from the coil and fan cover and dividing said food zone into at least two compartments, said duct means having air discharge openings proportioning air discharge into the compartments and different shelf areas of the food zone.

24. The modular top-defining unit according to claim 22, including separate door means for each shelf at the plural levels in each compartment, said doors being pivotally mounted for hinging movement from a closed position covering the respective shelf area thereof to an open position accessing such shelf area.

25. The modular top-defining unit according to claim 22, in which said air delivery duct is defined by a pair of panels removably assembled on spacer bars having projecting shelf pins on each end, said shelves abutting against said panels and holding them on said spacer bars.

26. The modular top-defining unit according to claim 21, in which said superstructure includes corner support columns and a center support frame, end wall panels removably closing the outer sides of said support columns, a top panel spanning said support columns and removably closing the top of the superstructure between the end wall panels, and said door means comprising plural doors removably mounted between the end wall panels and center support frame to swingingly depend in louvered relationship to close at least one side of the superstructure, and manual fastening means for removably securing the superstructure components together.

27. The modular top-defining unit according to claim 12, wherein said unit comprises a beverage dispensing counter for a cafeteria lineup and in which said one vertically disposed wall section defines a customer side of said countertop, said horizontal wall section having a longitudinally disposed grated opening adjacent to said customer side, and trough means underlying said grated opening for disposing of spilled fluids.

28. The modular top-defining unit according to claim 12, wherein said unit comprises a cashier's counter for a cafeteria or buffet lineup, said horizontal wall section being constructed and arranged to structurally support a cash register, and drawer means in one end frame member and being accommodated by the interior space of said support frame.

29. The modular top-defining unit according to claim 12, wherein the countertop is constructed of stainless steel of 16 gauge thickness or lighter.

30. The modular top-defining foodservice unit according to claim 22, further comprising a tray slide including a plurality of elongate substantially parallel bar members adapted to slidably support a food tray or the like thereon, and a bracket member constructed and arranged for mounting said bar members adjacent to said countertop, said bracket member having a plurality of recesses formed in its upper edge for receiving and orienting said bar members in laterally spaced relation, and deformable means integrally formed on said bracket member adjacent each recess for securing said bar member therein.

31. The modular top-defining foodservice unit according to claim 30, wherein said deformable means comprises tab means integrally formed with said bracket member and projecting upwardly from the upper edge thereof on each side of each said recess whereby to form upwardly opening, bar-receiving channels, and said tab means of each recess being deformable inwardly toward each other for frictionally gripping said bar member therein.

32. The modular top-defining unit according to claim 23, wherein said duct means comprises a pair of spaced apart duct panels extending generally transversely of the superstructure for dividing the food zone into said two compartments, each panel having plural rows of air outlet openings at the different shelf levels, and said air moving fan being adapted to maintain a substantially constant air pressure.

33. The modular top-defining unit of claim 10 which said adhesive means comprises double-sided adhesive tape selectively applied to the flange means of the end frame members and being bonded to the oriented opposed undersurface of the countertop wall sections.

34. A modular top-defining foodservice unit constructed and arranged for interlocking relationship with at least one other top-defining unit to form an aligned, substantially continuous counter, said top-defining unit comprising:
   a countertop having a substantially horizontal wall section with a well therein, and a support frame for the countertop constructed and arranged in underlying supporting position;
   a refrigeration coil disposed in the countertop well, and a coil and fan cover for the refrigeration coil having air return openings therein;
   a superstructure projecting upwardly from the horizontal countertop wall and forming at least two compartments for refrigerated foods each of which includes vertically spaced shelves dividing the compartments into plural sections supported by the superstructure, end panels closing the outer ends of the compartments and having the outer edges of the shelves in adjacent but spaced relation to define vertical air return channels in communication with the air return openings, central duct means extending upwardly form the coil and fan cover and having discharge openings laterally into said plural sections, and
   fan means for circulating cooled air into said duct means from the well and substantially uniformly throughout said compartment sections.

35. A two tier counter system for use in commercial foodservice, comprising:
   an upper level tier of top-defining modular counter units releasably interlocked in aligned end-to-end abutting relationship, and being constructed and arranged for receiving the selective placement of a lower level tier of base-defining support means throughout its length; each of said modular units comprising:
   a countertop having an upper substantially horizontal wall section with spaced side margins and at least one substantially vertical wall section integrally formed from one of said side margins, said horizontal and vertical wall sections having contiguous outer end margins,
   an open support frame for said countertop including transverse end frame members underlying said countertop adjacent to the end margins thereof, and at least one longitudinal frame member interconnecting said end frame members and being constructed and arranged for the structural engagement and support of said countertop substantially at the juncture of the horizontal and vertical wall sections whereby to provide a substantially unrestricted open area between said end margins for accommodating different countertop configurations including those having recessed wells extending below said horizontal wall section, and means for securing said countertop to said longitudinal and end frame members of said open support frame,
   said open support frame further including mounting means extending longitudinally between said end frame members and being secured thereto at a preselected transverse location for longitudinal alignment with the mounting means of an adjacent modular unit, and latching means on said support frame adjacent to at least one transverse end frame member in releasable interlocking engagement with the latching means of the modular top-defining unit adjacent thereto; and a lower level tier of base-defining support means including cabinet and leg means selectively and longitudinally placed in underlying supporting position below said upper level tier of modular units and being constructed and arranged for attachment to the mounting means of the support frames of the modular units.

36. The two-tier counter system according to claim 35, in which said open support frames of the upper level tier of counter units are substantially identical and include said latching means mounted on the end frame panels at the outer ends of each counter unit, said latching means comprising first and second latch members mounted on each end frame panel in cooperable releasable latching engagement with opposed second and first latch members, respectively, on the opposed end frame panel of the adjacent modular counter unit, whereby said latching means comprises dual locking units of first and second latch members in reverse orientation between the opposed end frame panels of adjacent counter units.

37. The two-tier counter system according to claim 35 and further including countertop orientation means constructed and arranged on the end frame panel of each counter unit for keying onto the adjacent counter unit, said orientation means comprising projecting pin means mounted to extend outwardly adjacent to one side of each counter unit end frame member and a receiving aperature on the other side of each end frame member to thereby form oppositely extending and aligned pin means and receiving aperatures in the opposed counter unit end frame members.

38. The two-tier counter system of claim 37, in which said projecting pin means is removable, and means constructed and arranged for selectively applying a finish end panel to one end frame member of an upper level counter unit.

39. The two-tier counter system according to claim 35, in which said base-defining support means of said lower level tier is selected from a class comprising a dual leg assembly, a compound leg assembly, an open shelf cabinet, single or dual door closed cabinets, and a refrigeration base unit.

40. The two-tier counter system according to claim 35, in which said support frames of the modular counter units define open interior spaces accommodating different commercial food service countertops selected from a class comprising a back-bar or chef's counter, a starter station counter, a surface counter, a hot food counter, a cold pan counter, a selector case supporting counter, a beverage dispensing counter, a corner counter, and a cashier's counter.

* * * * *

UNITED STATES PATENT AND TRADEMARK OFFICE
CERTIFICATE OF CORRECTION

PATENT NO. : 5,163,536

DATED : November 17, 1992

INVENTOR(S) : Albert P. Tuhro, Frank Kremer and Michael G. Hanewinkel

It is certified that error appears in the above-identified patent and that said Letters Patent is hereby corrected as shown below:

Column 3, line 12, after "present" insert --invention--.

Claim 11, column 17, line 1, after "members" insert --comprise vertical panels--.

Claim 20, column 18, line 2, change the dependency from "claim 14" to --claim 19--.

Claim 37, column 21, line 23, change the dependency from "claim 35" to --claim 36--.

Signed and Sealed this

Twenty-fifth Day of January, 1994

Attest:

BRUCE LEHMAN

Attesting Officer

Commissioner of Patents and Trademarks